(12) United States Patent
Liu et al.

(10) Patent No.: US 12,339,382 B2
(45) Date of Patent: Jun. 24, 2025

(54) POSITIONING METHOD, APPARATUS, AND SYSTEM

(71) Applicant: HUAWEI TECHNOLOGIES CO., LTD., Guangdong (CN)

(72) Inventors: Mengting Liu, Beijing (CN); Su Huang, Shanghai (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 17/853,151

(22) Filed: Jun. 29, 2022

(65) Prior Publication Data
US 2022/0326334 A1    Oct. 13, 2022

Related U.S. Application Data

(63) Continuation of application No. PCT/CN2019/130981, filed on Dec. 31, 2019.

(51) Int. Cl.
*G01S 5/00* (2006.01)
*G01S 5/02* (2010.01)
(Continued)

(52) U.S. Cl.
CPC .......... *G01S 5/0063* (2013.01); *G01S 5/0236* (2013.01); *H04L 5/0051* (2013.01); *H04W 64/00* (2013.01)

(58) Field of Classification Search
None
See application file for complete search history.

(56) References Cited

U.S. PATENT DOCUMENTS 10,736,074 B2 * 8/2020 Edge ................ H04B 7/0897
2018/0017657 A1   1/2018 Kojima
(Continued)

FOREIGN PATENT DOCUMENTS

CN    101137226 A    3/2008
CN    103945331 A    7/2014
(Continued)

OTHER PUBLICATIONS

R1-1812236, Huawei et al., Potential techniques for NR positioning, 3GPP TSG RAN WG1 Meeting #95, Spokane, USA, Nov 12-Nov. 16, 2018, 7 pages, XP051478392.
(Continued)

*Primary Examiner* — Adolf Dsouza
(74) *Attorney, Agent, or Firm* — WOMBLE BOND DICKINSON (US) LLP

(57) ABSTRACT

Methods of ascertaining a location of an apparatus, and associated systems are disclosed. An example method includes: receiving, by a terminal device or a chip thereof, a plurality of assistance data including one or more groups of mapping relationships corresponding to one or more preset angles, and each group of mapping relationships includes a mapping relationship between each of one or more PRS resource identifiers and power information corresponding to each PRS resource identifier at a corresponding preset angle. The terminal device determines power information corresponding to one or more PRS resource identifiers which correspond to each of a plurality of to-be-measured angles. The terminal device ascertains its location based on the plurality of assistance data and the power information corresponding to the one or more PRS resource identifiers at each of the plurality of to-be-measured angles.

20 Claims, 13 Drawing Sheets

(51) Int. Cl.
  *H04L 5/00* (2006.01)
  *H04W 64/00* (2009.01)

(56) References Cited

U.S. PATENT DOCUMENTS

| | | | |
|---|---|---|---|
| 2018/0199160 | A1 | 7/2018 | Edge |
| 2019/0037529 | A1* | 1/2019 | Edge ............... G01S 1/0428 |
| 2020/0178202 | A1* | 6/2020 | Edge ............... H04W 24/10 |

FOREIGN PATENT DOCUMENTS

| | | |
|---|---|---|
| CN | 105282843 A | 1/2016 |
| CN | 105589506 A | 5/2016 |
| JP | H1164500 A | 3/1999 |
| JP | 2012531583 A | 12/2012 |
| JP | 2015210093 A | 11/2015 |
| WO | 2019027595 A1 | 2/2019 |

OTHER PUBLICATIONS

3GPP TS 36.331 V15.7.0 (Sep. 2019), 3rd Generation Partnership Project; Technical Specification Group Radio Access Network; Evolved Universal Terrestrial Radio Access (E-UTRA); Radio Resource Control (RRC);Protocol specification (Release 15), 962 pages.
R1-1910393, Huawei et al., Angle resolution and beam configuration related procedures for NR positioning, 3GPP TSG RAN WG1 Meeting #98bis, Chongqing, China, Oct. 14-20, 2019, 8 pages, XP051808552.
3GPP TS 37.355 V15.0.0 (Dec. 2019), 3rd Generation Partnership Project; Technical Specification Group Radio Access Network;LTE Positioning Protocol (LPP)(Release 15), 224 pages.
3GPP TS 38.305 V15.4.0 (Jun. 2019), 3rd Generation Partnership Project; Technical Specification Group Radio Access Network;NG Radio Access Network (NG-RAN); Stage 2 functional specification ofUser Equipment (UE) positioning in NG-RAN(Release 15), 72 pages.
3GPP TS 38.321 V15.7.0 (Sep. 2019), 3rd Generation Partnership Project; Technical Specification Group Radio Access Network; NR;Medium Access Control (MAC) protocol specification(Release 15), 78 pages.
3GPP TS 38.331 V15.7.0 (Sep. 2019), 3rd Generation Partnership Project; Technical Specification Group Radio Access Network;NR- ;Radio Resource Control (RRC) protocol specification(Release 15), 527 pages.
3GPP TS 38.455 V16.0.0 (Jul. 2020), 3rd Generation Partnership Project; Technical Specification Group Radio Access Network;NG-RAN;NR Positioning Protocol A (NRPPa) (Release 16), 60 pages.
R2-1915563, Revision of R2-1913399, Qualcomm Incorporated, Assistance Data for DL-only UE-based mode, 3GPP TSG-RAN WG2 Meeting #108, Reno, Nevada, USA, Nov. 18-22, 2019, 14 pages.
3GPP TSG RAN WG1 Meeting #98bis, R1-1910036, Physical layer procedure for NR positioning, Huawei, HiSilicon,Oct. 20, 2019, total 18 pages.

* cited by examiner

POSITIONING METHOD, APPARATUS, AND SYSTEM

CROSS-REFERENCE TO RELATED APPLICATIONS

This application is a continuation of International Application No. PCT/CN2019/130981, filed on Dec. 31, 2019, the disclosure of which is hereby incorporated by reference in its entirety.

TECHNICAL FIELD

This application relates to the field of positioning technologies, and in particular, to a method, an apparatus, or a system for ascertaining positions of or locating devices.

BACKGROUND

Existing positioning methods for locating devices (hereinafter "positioning method(s)") mainly include a user equipment based (UE-based) positioning method, a user equipment assisted (UE-assisted) positioning method, and a standalone positioning method. In the UE-based positioning method, when assistance data is available, UE is responsible not only for providing a measurement result, but also for performing location calculations based on the measurement result and the assistance data. In the UE-assisted positioning method, when assistance data is available, the UE is only responsible for providing a measurement result and does not perform location calculations, and a location management function (LMF) network element performs location calculations based on the measurement result and the assistance data. In the standalone positioning method, the UE performs measurement and location calculation without network assistance data. It can be learned that the assistance data may assist the LMF network element or the UE in performing location calculation.

Currently, for a downlink-angle of departure (DL-AoD) positioning method, one solution is a conclusion reached in a radio access network (RAN) 2#108 meeting: Assistance data for performing location calculation includes spatial direction information of a positioning reference signal (PRS) resource, for example, an azimuth, an elevation, or a beam width. However, only a rough range of an angle (angle of departure or angle of arrival) can be estimated based on the assistance information in this solution, and high-accuracy positioning cannot be implemented. To achieve a high-accuracy positioning objective, new assistance data needs to be designed for accurate angle estimation.

SUMMARY

Embodiments of this application provide a a method, an apparatus, or a system for ascertaining positions of or locating devices, to resolve a problem that only a rough range of an angle (angle of departure or angle of arrival) can be estimated based on existing assistance data and that high-accuracy positioning cannot be implemented.

To achieve the foregoing objective, the following technical solutions are used in embodiments of this application.

According to a first aspect, a positioning method is provided. A communication apparatus that performs the method may be a terminal device, or may be a module applied to a terminal device, for example, a chip or a system-on-chip. The following is described by using an example in which an execution body is a terminal device. The terminal device obtains a plurality of assistance data, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more positioning reference signal (PRS) resource identifiers and power information corresponding to each PRS resource identifier at a corresponding preset angle; the terminal device determines power information corresponding to one or more PRS resource identifiers which correspond to each of a plurality of to-be-measured angles; and the terminal device positions the terminal device (itself, e.g., ascertains or identifies the position thereof) based on the plurality of assistance data and the power information corresponding to the one or more PRS resource identifiers at each of the plurality of to-be-measured angles.

Currently, only a rough range of an angle (angle of departure or angle of arrival) can be estimated based on existing assistance data, and high-accuracy positioning cannot be implemented. Based on the positioning method provided in this embodiment of this application, the assistance data in this embodiment of this application includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, the terminal device can accurately estimate a to-be-measured angle (for example, an angle of departure or an angle of arrival) based on the plurality of assistance data and the power information corresponding to the one or more PRS resource identifiers at each of the plurality of to-be-measured angles, and can further implement high-accuracy positioning. According to another aspect, a communication system provided in this embodiment of this application provides an implementable solution to UE-based AoD positioning.

With reference to the first aspect, in an embodiment, that the terminal device positions the terminal device based on the plurality of assistance data and the power information corresponding to the one or more PRS resource identifiers at each of the plurality of to-be-measured angles includes: the terminal determines the plurality of to-be-measured angles based on the plurality of assistance data and the power information corresponding to the one or more PRS resource identifiers at each of the plurality of to-be-measured angles; and the terminal device positions the terminal device based on the plurality of to-be-measured angles and location information of an access network device corresponding to each of the plurality of to-be-measured angles.

With reference to the first aspect, in an embodiment, that the terminal device obtains a plurality of assistance data includes: the terminal device receives the plurality of assistance data from a location management device.

With reference to the first aspect, in an embodiment, the method further includes: the terminal device sends a third request message to the location management device, where the third request message is used to request the assistance data.

With reference to the first aspect, in an embodiment, that the terminal device obtains a plurality of assistance data includes: the terminal device receives the plurality of assistance data from one or more access network devices.

With reference to the first aspect, in an embodiment, the method further includes: the terminal device sends a second request message to the one or more access network devices, where the second request message is used to request the assistance data.

With reference to the first aspect, in an embodiment, the communication method provided in this embodiment of this application further includes: the terminal device sends a positioning request to a mobility management network element, where the positioning request is used to request to position the terminal device.

In other words, a positioning procedure in this embodiment of this application may be triggered by the terminal device.

In an embodiment, the communication method provided in this embodiment of this application further includes: the terminal device sends location information of the terminal device to the location management device.

Based on this solution, the location management device may learn the location information of the terminal device.

According to a second aspect, a positioning method is provided. A communication apparatus that performs the method may be an access network device, or may be a module applied to an access network device, for example, a chip or a system-on-chip. The following is described by using an example in which an execution body is an access network device. The access network device establishes or updates assistance data, where the assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the access network device sends the assistance data.

Currently, only a rough range of an angle (angle of departure or angle of arrival) can be estimated based on existing assistance data, and high-accuracy positioning cannot be implemented. Based on the positioning method provided in this embodiment of this application, the assistance data in this embodiment of this application includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, a location management device can accurately estimate an angle (for example, an angle of departure or an angle of arrival) based on the plurality of assistance data and power information corresponding to one or more PRS resource identifiers at each of the plurality of to-be-measured angles, and can further implement high-accuracy positioning.

With reference to the second aspect, in an embodiment, that the access network device sends the assistance data includes: the access network device sends the assistance data to the location management device.

With reference to the second aspect, in an embodiment, before the access network device sends the assistance data to the location management device, the method further includes: the access network device receives a first request message from the location management device, where the first request message is used to request the assistance data.

With reference to the second aspect, in an embodiment, that the access network device sends the assistance data includes: the access network device sends the assistance data to a terminal device.

With reference to the second aspect, in an embodiment, before the access network device sends the assistance data to the terminal device, the method further includes: the access network device receives a second request message from the terminal device, where the second request message is used to request the assistance data.

According to a third aspect, a positioning method is provided. A communication apparatus that performs the method may be a location management device, or may be a module applied to a location management device, for example, a chip or a system-on-chip. The following is described by using an example in which an execution body is a location management device. The location management device obtains a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the location management device sends the plurality of assistance data to a terminal device.

Currently, only a rough range of an angle (angle of departure or angle of arrival) can be estimated based on existing assistance data, and high-accuracy positioning cannot be implemented. Based on the positioning method provided in this embodiment of this application, the assistance data in this embodiment of this application includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, a location management device can accurately estimate a to-be-measured angle (for example, an angle of departure or an angle of arrival) based on the plurality of assistance data and power information corresponding to one or more PRS resource identifiers which correspond to each of a plurality of to-be-measured angles, and can further implement high-accuracy positioning.

With reference to the third aspect, in an embodiment, the method further includes: the location management device sends a first request message to the one or more access network devices, where the first request message is used to request the assistance data.

With reference to the third aspect, in an embodiment, the method further includes: the location management device receives a third request message from the terminal device, where the third request message is used to request the assistance data.

With reference to the third aspect, in an embodiment, the method further includes: the location management device receives location information of the terminal device from the terminal device; and the location management device sends the location information of the terminal device to a mobility management network element.

With reference to the first aspect, the second aspect, or the third aspect, in an embodiment, the corresponding power information includes a power value corresponding to each of the one or more PRS resource identifiers at the corresponding preset or to-be-measured angle.

With reference to the first aspect, the second aspect, or the third aspect, in an embodiment, the corresponding power information includes a value obtained after the power value corresponding to each of the one or more PRS resource identifiers at the corresponding preset or to-be-measured angle is compressed.

In this manner, because the power value corresponding to each PRS resource identifier at the corresponding preset angle is compressed, signaling overheads can be reduced during transmission of the assistance data, and a positioning latency and power consumption can be reduced.

With reference to the first aspect, the second aspect, or the third aspect, in an embodiment, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

With reference to the first aspect, the second aspect, or the third aspect, in an embodiment, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

This solution is applicable to a case in which a difference between values is relatively large. Because a smaller compressed value can be obtained in this way, signaling overheads are reduced to a greater extent.

With reference to the first aspect, the second aspect, or the third aspect, in an embodiment, the corresponding power information includes a value relative to a reference second power value, for the power information corresponding to each of the one or more PRS resource identifiers at the corresponding preset or to-be-measured angle, where the second power value is a largest one of power values corresponding to different PRS resource identifiers at the one or more angles.

With reference to the first aspect, the second aspect, or the third aspect, in an embodiment, the corresponding power information includes a value relative to a reference previous power value, for the power information corresponding to each of the one or more PRS resource identifiers at the corresponding preset or to-be-measured angle, where power values corresponding to different PRS resource identifiers at all angles are sorted in ascending order or descending order.

This solution is applicable to a case in which a difference between values is relatively large. Because a smaller compressed value can be obtained in this way, signaling overheads are reduced to a greater extent.

With reference to the first aspect, the second aspect, or the third aspect, in an embodiment, the power value includes a radiated power value or a received power value.

With reference to the first aspect, the second aspect, or the third aspect, in an embodiment, the one or more PRS resource identifiers are PRS resource identifiers of all PRS resources that need to be measured at the corresponding preset or to-be-measured angle.

With reference to the first aspect, the second aspect, or the third aspect, in an embodiment, the one or more PRS resource identifiers are PRS resource identifiers of some PRS resources that need to be measured at the corresponding preset or to-be-measured angle.

This solution can reduce a data amount of the assistance data to some extent. Therefore, signaling overheads can be reduced during transmission of the assistance data, and the positioning latency and power consumption can be reduced.

For example, if power values corresponding to PRS resource identifiers of all PRS resources that need to be measured at the corresponding preset or to-be-measured angle are sorted in descending order, the some PRS resources include PRS resources corresponding to first M power values after sorting, where M is a positive integer greater than 1.

According to a fourth aspect, a communication apparatus is provided and is configured to perform the method in any one of the first aspect or the possible implementations of the first aspect. The communication apparatus may be the terminal device in any one of the first aspect or the possible implementations of the first aspect, or a module applied to the terminal device, for example, a chip or a system-on-chip. The communication apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

With reference to the fourth aspect, in an embodiment, the communication apparatus includes a transceiver module and a processing module, where the transceiver module is configured to obtain a plurality of assistance data, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; the processing module is configured to determine power information corresponding to one or more PRS resource identifiers which correspond to each of a plurality of to-be-measured angles; and the processing module is further configured to position the terminal device based on the plurality of assistance data and the power information corresponding to the one or more PRS resource identifiers at each of the plurality of to-be-measured angles.

With reference to the fourth aspect, in an embodiment, that the processing module is further configured to position the terminal device based on the plurality of assistance data and the power information corresponding to the one or more PRS resource identifiers at each of the plurality of to-be-measured angles includes: the processing module is further configured to determine the plurality of to-be-measured angles based on the plurality of assistance data and the power information corresponding to the one or more PRS resource identifiers at each of the plurality of to-be-measured angles; and position the terminal device based on the plurality of to-be-measured angles and location information of an access network device corresponding to each of the plurality of to-be-measured angles.

With reference to the fourth aspect, in an embodiment, the transceiver module is configured to receive the plurality of assistance data from a location management device.

With reference to the fourth aspect, in an embodiment, the transceiver module is further configured to send a third request message to the location management device, where the third request message is used to request the assistance data.

With reference to the fourth aspect, in an embodiment, the transceiver module is configured to receive the plurality of assistance data from one or more access network devices.

With reference to the fourth aspect, in an embodiment, the transceiver module is further configured to send a second request message to the one or more access network devices, where the second request message is used to request the assistance data.

With reference to the fourth aspect, in an embodiment, the transceiver module is further configured to send a positioning request to a mobility management network element, where the positioning request is used to request to position the terminal device.

With reference to the fourth aspect, in an embodiment, the transceiver module is further configured to send location information of the terminal device to the location management device.

According to a fifth aspect, a communication apparatus is provided. The communication apparatus may be the terminal device in any one of the first aspect or the possible implementations of the first aspect, or a module applied to the terminal device, for example, a chip or a system-on-chip. The communication apparatus includes a transceiver and a processor, where the transceiver is configured to obtain a plurality of assistance data, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; the processor is configured to determine power information corresponding to one or more PRS resource identifiers which correspond to each of a plurality of to-be-measured angles; and the processor is further configured to position the terminal device based on the plurality of assistance data and the power information corresponding to the one or more PRS resource identifiers at each of the plurality of to-be-measured angles.

With reference to the fifth aspect, in an embodiment, that the processor is further configured to position the terminal device based on the plurality of assistance data and the power information corresponding to the one or more PRS resource identifiers at each of the plurality of to-be-measured angles, includes: the processor is further configured to determine the plurality of to-be-measured angles based on the plurality of assistance data and the power information corresponding to the one or more PRS resource identifiers at each of the plurality of to-be-measured angles; and position the terminal device based on the plurality of to-be-measured angles and location information of an access network device corresponding to each of the plurality of to-be-measured angles.

With reference to the fifth aspect, in an embodiment, the transceiver is configured to receive the plurality of assistance data from a location management device.

With reference to the fifth aspect, in an embodiment, the transceiver is further configured to send a third request message to the location management device, where the third request message is used to request the assistance data.

With reference to the fifth aspect, in an embodiment, the transceiver is configured to receive the plurality of assistance data from one or more access network devices.

With reference to the fifth aspect, in an embodiment, the transceiver is further configured to send a second request message to the one or more access network devices, where the second request message is used to request the assistance data.

With reference to the fifth aspect, in a an embodiment, the transceiver is further configured to send a positioning request to a mobility management network element, where the positioning request is used to request to position the terminal device.

With reference to the fifth aspect, in a an embodiment, the transceiver is further configured to send location information of the terminal device to the location management device.

With reference to the fourth aspect or the fifth aspect, in an embodiment, the corresponding power information includes a power value corresponding to each of the one or more PRS resource identifiers at the corresponding preset or to-be-measured angle.

With reference to the fourth aspect or the fifth aspect, in an embodiment, the corresponding power information includes a value obtained after the power value corresponding to each of the one or more PRS resource identifiers at the corresponding preset or to-be-measured angle is compressed.

With reference to the fourth aspect or the fifth aspect, in an embodiment, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

With reference to the fourth aspect or the fifth aspect, in an embodiment, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

With reference to the fourth aspect or the fifth aspect, in an embodiment, the corresponding power information includes a value relative to a reference second power value, for the power information corresponding to each of the one or more PRS resource identifiers at the corresponding preset or to-be-measured angle, where the second power value is a largest one of power values corresponding to different PRS resource identifiers at the one or more angles.

With reference to the fourth aspect or the fifth aspect, in an embodiment, the corresponding power information includes a value relative to a reference previous power value, for the power information corresponding to each of the one or more PRS resource identifiers at the corresponding preset or to-be-measured angle, where power values corresponding to different PRS resource identifiers at all angles are sorted in ascending order or descending order.

With reference to the fourth aspect or the fifth aspect, in an embodiment, the power value includes a radiated power value or a received power value.

With reference to the fourth aspect or the fifth aspect, in an embodiment, the one or more PRS resource identifiers are PRS resource identifiers of all PRS resources that need to be measured at the corresponding preset or to-be-measured angle.

With reference to the fourth aspect or the fifth aspect, in an embodiment, the one or more PRS resource identifiers are PRS resource identifiers of some PRS resources that need to be measured at the corresponding preset or to-be-measured angle.

For example, if power values corresponding to PRS resource identifiers of all PRS resources that need to be measured at the corresponding preset or to-be-measured angle are sorted in descending order, some PRS resources include PRS resources corresponding to first M power values after the sorting, where M is a positive integer greater than 1.

According to a sixth aspect, a communication apparatus is provided. The communication apparatus may be the terminal device in any one of the first aspect or the possible implementations of the first aspect, or a module applied to the terminal device, for example, a chip or a system-on-chip. The communication apparatus includes at least one processor, configured to perform the method in any one of the first aspect or the possible implementations of the first aspect.

For example, the communication apparatus further includes a memory, the memory is coupled to the at least one processor, and the at least one processor is configured to perform the method in any one of the first aspect or the possible implementations of the first aspect.

In an embodiment, the memory is configured to store program instructions and data. The memory is coupled to the at least one processor, and the at least one processor may invoke and execute the program instructions stored in the memory, to perform the method in any one of the first aspect or the possible implementations of the first aspect.

For example, the communication apparatus further includes a communication interface, and the communication interface is used by the communication apparatus to communicate with another device. When the communication apparatus is the terminal device, the communication interface is a transceiver, an input/output interface, a circuit, or the like.

In a possible design, that the communication apparatus includes at least one processor and a communication interface configured to perform the method in any one of the first aspect or the possible implementations of the first aspect includes: the at least one processor communicates with an outside by using the communication interface; and the at least one processor is configured to run a computer program, so that the communication apparatus performs the method in any one of the first aspect or the possible implementations of the first aspect. It may be understood that the outside may be an object other than the processor or an object other than the communication apparatus.

In another possible design, the communication apparatus is a chip or a system-on-chip. The communication interface may be an input/output interface, an interface circuit, an output circuit, an input circuit, a pin, a related circuit, or the like in the chip or the system-on-chip. The processor may alternatively be embodied as a processing circuit or a logic circuit.

According to a seventh aspect, a computer-readable storage medium is provided. A computer program is stored in the computer-readable storage medium. When the computer program is executed by a communication apparatus, the communication apparatus is enabled to perform the method in any one of the first aspect or the possible implementations of the first aspect.

According to an eighth aspect, a computer program product including instructions is provided. When the instructions are executed by a computer, a communication apparatus is enabled to perform the method in any one of the first aspect or the possible implementations of the first aspect.

For technical effects brought by any one of the designs of the fourth aspect to the eighth aspect, refer to the technical effects brought by the different designs of the first aspect. Details are not described herein again.

According to a ninth aspect, a communication apparatus is provided and is configured to perform the method in any one of the second aspect or the possible implementations of the second aspect. The communication apparatus may be the access network device in any one of the second aspect or the possible implementations of the second aspect, or a module applied to the access network device, for example, a chip or a system-on-chip. The communication apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

With reference to the ninth aspect, in an embodiment, the communication apparatus includes a transceiver module and a processing module, where the processing module is configured to establish or update assistance data, where the assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding angle; and the transceiver module is configured to send the assistance data.

With reference to the ninth aspect, in an embodiment, the transceiver module is configured to send the assistance data to a location management device.

With reference to the ninth aspect, in an embodiment, before sending the assistance data to the location management device, the transceiver module is further configured to receive a first request message from the location management device, where the first request message is used to request the assistance data.

With reference to the ninth aspect, in an embodiment, the transceiver module is configured to send the assistance data to a terminal device.

With reference to the ninth aspect, in an embodiment, before sending the assistance data to the terminal device, the transceiver module is further configured to receive a second request message from the terminal device, where the second request message is used to request the assistance data.

According to a tenth aspect, a communication apparatus is provided. The communication apparatus may be the access network device in any one of the second aspect or the possible implementations of the second aspect, or a module applied to the access network device, for example, a chip or a system-on-chip. The communication apparatus includes a transceiver and a processor, where the processor is configured to establish or update assistance data, where the assistance data includes one or more groups of mapping relationships corresponding to one or more angles, each of the one or more groups of mapping relationships corresponds to one of the one or more angles, and each group of mapping relationships includes a mapping relationship between each of one or more PRS resource identifiers and power information corresponding to each PRS resource identifier at a corresponding angle; and the transceiver is configured to send the assistance data.

With reference to the tenth aspect, in an embodiment, the transceiver is configured to send the assistance data to a location management device.

With reference to the tenth aspect, in an embodiment, before sending the assistance data to the location management device, the transceiver is further configured to receive a first request message from the location management device, where the first request message is used to request the assistance data.

With reference to the tenth aspect, in an embodiment, the transceiver is configured to send the assistance data to a terminal device.

With reference to the tenth aspect, in an embodiment, before sending the assistance data to the terminal device, the transceiver is further configured to receive a second request message from the terminal device, where the second request message is used to request the assistance data.

With reference to the ninth aspect or the tenth aspect, in an embodiment, the corresponding power information includes a power value corresponding to each of the one or more PRS resource identifiers at the corresponding preset or to-be-measured angle.

With reference to the ninth aspect or the tenth aspect, in an embodiment, the corresponding power information includes a value obtained after the power value corresponding to each of the one or more PRS resource identifiers at the corresponding preset or to-be-measured angle is compressed.

With reference to the ninth aspect or the tenth aspect, in an embodiment, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

With reference to the ninth aspect or the tenth aspect, in an embodiment, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

With reference to the ninth aspect or the tenth aspect, in an embodiment, the corresponding power information includes a value relative to a reference second power value, for the power information corresponding to each of the one or more PRS resource identifiers at the corresponding preset or to-be-measured angle, where the second power value is a largest one of power values corresponding to different PRS resource identifiers at the one or more angles.

With reference to the ninth aspect or the tenth aspect, in an embodiment, the corresponding power information includes a value relative to a reference previous power value, for the power information corresponding to each of the one or more PRS resource identifiers at the corresponding preset or to-be-measured angle, where power values corresponding to different PRS resource identifiers at the all angles are sorted in ascending order or descending order.

With reference to the ninth aspect or the tenth aspect, in an embodiment, the power value includes a radiated power value or a received power value.

With reference to the ninth aspect or the tenth aspect, in an embodiment, the one or more PRS resource identifiers are PRS resource identifiers of all PRS resources that need to be measured at the corresponding preset or to-be-measured angle.

With reference to the ninth aspect or the tenth aspect, in an embodiment, the one or more PRS resource identifiers are PRS resource identifiers of some PRS resources that need to be measured at the corresponding preset or to-be-measured angle.

For example, if power values corresponding to PRS resource identifiers of all PRS resources that need to be measured at the corresponding preset or to-be-measured angle are sorted in descending order, some PRS resources include PRS resources corresponding to first M power values after the sorting, where M is a positive integer greater than 1.

According to an eleventh aspect, a communication apparatus is provided. The communication apparatus may be the access network device in any one of the second aspect or the possible implementations of the second aspect, or a module applied to the access network device, for example, a chip or a system-on-chip. The communication apparatus includes at least one processor, configured to perform the method in any one of the second aspect or the possible implementations of the second aspect.

For example, the communication apparatus further includes a memory, the memory is coupled to the at least one processor, and the at least one processor is configured to perform the method in any one of the second aspect or the possible implementations of the second aspect.

In an embodiment, the memory is configured to store program instructions and data. The memory is coupled to the at least one processor, and the at least one processor may invoke and execute the program instructions stored in the memory, to perform the method in any one of the second aspect or the possible implementations of the second aspect.

For example, the communication apparatus further includes a communication interface, and the communication interface is used by the communication apparatus to communicate with another device. When the communication apparatus is the access network device, the communication interface is a transceiver, an input/output interface, a circuit, or the like.

In a possible design, that the communication apparatus includes at least one processor and a communication interface configured to perform the method in any one of the second aspect or the possible implementations of the second aspect includes: the at least one processor communicates with an outside by using the communication interface; and the at least one processor is configured to run a computer program, so that the communication apparatus performs the method in any one of the second aspect or the possible implementations of the second aspect. It may be understood that the outside may be an object other than the processor or an object other than the communication apparatus.

In another possible design, the communication apparatus is a chip or a system-on-chip. The communication interface may be an input/output interface, an interface circuit, an output circuit, an input circuit, a pin, a related circuit, or the like in the chip or the system-on-chip. The processor may alternatively be embodied as a processing circuit or a logic circuit.

According to a twelfth aspect, a computer-readable storage medium is provided. A computer program is stored in the computer-readable storage medium. When the computer program is executed by a communication apparatus, the communication apparatus is enabled to perform the method in any one of the second aspect or the possible implementations of the second aspect.

According to a thirteenth aspect, a computer program product including instructions is provided. When the instructions are executed by a computer, a communication apparatus is enabled to perform the method in any one of the second aspect or the possible implementations of the second aspect.

For technical effects brought by any one of the design manners of the ninth aspect to the thirteenth aspect, refer to technical effects brought by different design manners of the second aspect. Details are not described herein again.

According to a fourteenth aspect, a communication apparatus is provided and is configured to perform the method in any one of the third aspect or the possible implementations of the third aspect. The communication apparatus may be the location management device in any one of the third aspect or the possible implementations of the third aspect, or a module applied to the location management device, for example, a chip or a system-on-chip. The communication apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

With reference to the fourteenth aspect, in an embodiment, the communication apparatus includes a transceiver module, where the transceiver module is configured to obtain a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the transceiver module is further configured to send the plurality of assistance data to a terminal device.

With reference to the fourteenth aspect, in an embodiment, the transceiver module is further configured to send a first request message to the one or more access network devices, where the first request message is used to request the assistance data.

With reference to the fourteenth aspect, in an embodiment, the transceiver module is further configured to receive a third request message from the terminal device, where the third request message is used to request the assistance data.

With reference to the fourteenth aspect, in an embodiment, the transceiver module is further configured to receive location information of the terminal device from the terminal device; and the transceiver module is further configured to send the location information of the terminal device to a mobility management network element.

According to a fifteenth aspect, a communication apparatus is provided. The communication apparatus may be the location management device in any one of the third aspect or the possible implementations of the third aspect, or a module applied to the location management device, for example, a chip or a system-on-chip. The communication apparatus includes a transceiver, where the transceiver is configured to obtain a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the transceiver is further configured to send the plurality of assistance data to a terminal device.

With reference to the fifteenth aspect, in an embodiment, the transceiver is further configured to send a first request message to the one or more access network devices, where the first request message is used to request the assistance data.

With reference to the fifteenth aspect, in an embodiment, the transceiver is further configured to receive a third request message from the terminal device, where the third request message is used to request the assistance data.

With reference to the fifteenth aspect, in an embodiment, the transceiver is further configured to receive location information of the terminal device from the terminal device; and the transceiver is further configured to send the location information of the terminal device to a mobility management network element.

According to a sixteenth aspect, a communication apparatus is provided. The communication apparatus may be the location management device in any one of the third aspect or the possible implementations of the third aspect, or a module applied to the location management device, for example, a chip or a system-on-chip. The communication apparatus includes at least one processor, configured to perform the method in any one of the third aspect or the possible implementations of the third aspect.

For example, the communication apparatus further includes a memory, the memory is coupled to the at least one processor, and the at least one processor is configured to perform the method in any one of the third aspect or the possible implementations of the third aspect.

In an embodiment, the memory is configured to store program instructions and data. The memory is coupled to the at least one processor, and the at least one processor may invoke and execute the program instructions stored in the memory, to perform the method in any one of the third aspect or the possible implementations of the third aspect.

For example, the communication apparatus further includes a communication interface, and the communication interface is used by the communication apparatus to communicate with another device. When the communication apparatus is the location management device, the communication interface is a transceiver, an input/output interface, a circuit, or the like.

In a possible design, that the communication apparatus includes at least one processor and a communication interface configured to perform the method in any one of the third aspect or the possible implementations of the third aspect includes: the at least one processor communicates with an outside by using the communication interface; and the at least one processor is configured to run a computer program, so that the communication apparatus performs the method in any one of the third aspect or the possible implementations of the third aspect. It may be understood that the outside may be an object other than the processor or an object other than the communication apparatus.

In another possible design, the communication apparatus is a chip or a system-on-chip. The communication interface may be an input/output interface, an interface circuit, an output circuit, an input circuit, a pin, a related circuit, or the like in the chip or the system-on-chip. The processor may alternatively be embodied as a processing circuit or a logic circuit.

According to a seventeenth aspect, a computer-readable storage medium is provided. A computer program is stored in the computer-readable storage medium. When the computer program is executed by a communication apparatus, the communication apparatus is enabled to perform the method in any one of the third aspect or the possible implementations of the third aspect.

According to an eighteenth aspect, a computer program product including instructions is provided. When the instructions are executed by a computer, a communication apparatus is enabled to perform the method in any one of the third aspect or the possible implementations of the third aspect.

For technical effects brought by any one of the design manners of the fourteenth aspect to the eighteenth aspect, refer to technical effects brought by different design manners of the third aspect. Details are not described herein again.

According to a nineteenth aspect, a positioning system is provided. The positioning system includes a communication apparatus configured to implement the method according to the first aspect, one or more communication apparatuses configured to perform the method according to the second aspect, and a communication apparatus configured to perform the method according to the third aspect.

DESCRIPTION OF EMBODIMENTS

For ease of understanding solutions in the embodiments of this application, brief descriptions or definitions of related technologies are first provided as follows: First,
  the assistance data may assist an LMF network element in performing location calculation in a user equipment assisted (UE-assisted) positioning method, or the assistance data may assist UE in performing location calculation in a UE-based positioning method. Using the UE-assisted positioning method as an example, a base station and/or the UE need/needs to transmit the assistance data to the LMF network element, to assist the LMF network element in performing location calculation. Content of the assistance data depends on capabilities of the base station and the UE. Using a DL-AoD positioning method as an example, the assistance data may be classified into the following types:
  measurement assistance data: including positioning reference signal (PRS) configuration information, and the like; and
  calculation assistance data: including a PRS resource identifier (resource ID), geographical coordinates of a transmission-reception point (transmission-reception point, TRP), timing information of the TRP, and the like. Second, angle of departure may be used.

Figure 1:
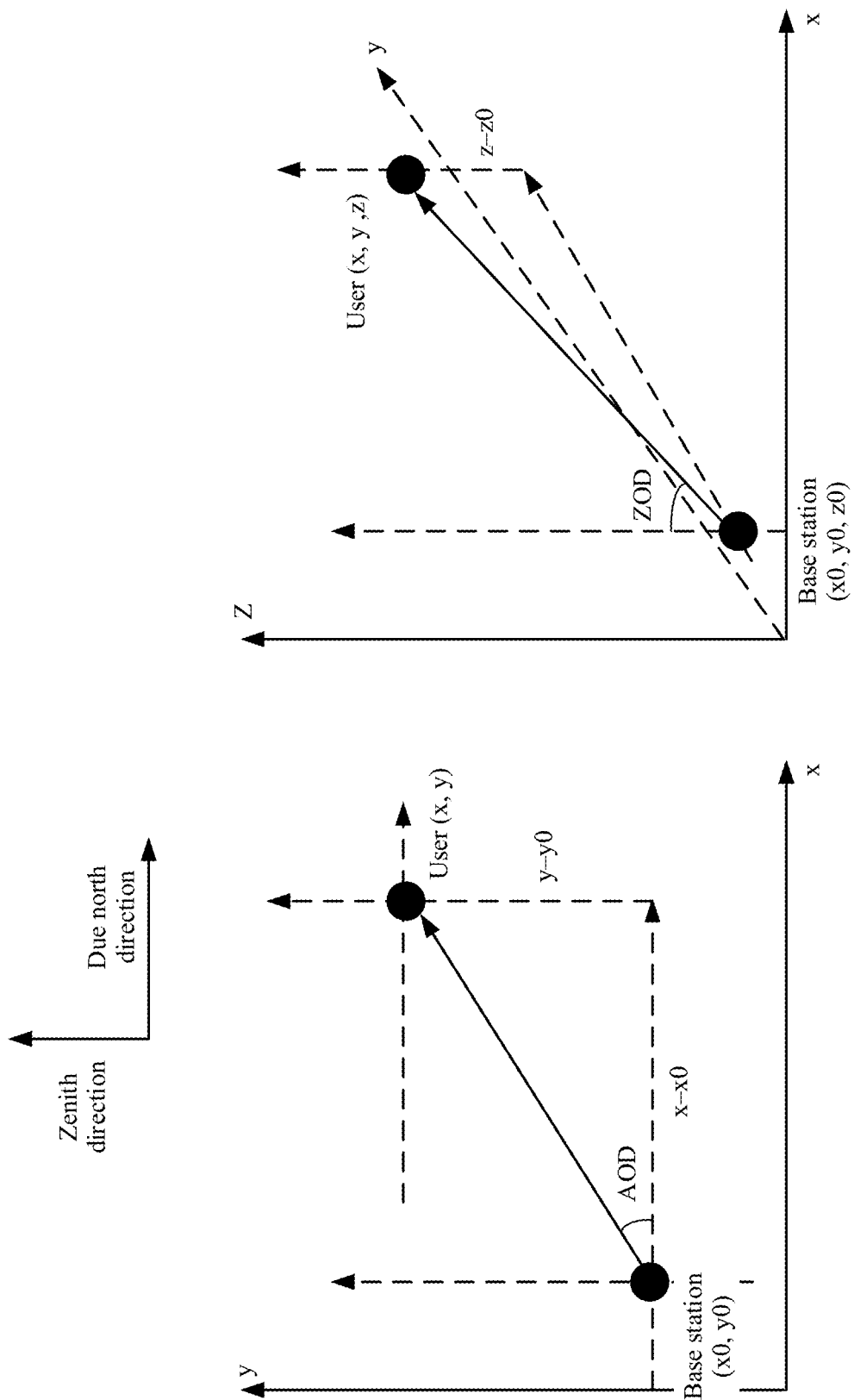
FIG. 1 is a schematic diagram of an existing angle of departure.

An azimuth AOD and a zenith AOD are important angle information in an angle-based positioning method. As shown in FIG. 1, both the azimuth angle of departure and the zenith angle of departure are information about an angle of departure (radio signals sent from the base station to a user). The azimuth angle of departure is an included angle with a due north direction (a clockwise direction is positive), and the zenith angle of departure is an included angle with a zenith direction. If coordinate information of the base station and information about the azimuth angle of departure and the zenith angle of departure are obtained, a location (three-dimensional) of the user may be calculated. For ease of description, in the embodiments of this application, the azimuth angle of departure and the zenith angle of departure are collectively referred to as the angle of departure. The AOD hereinafter also refers to the angle of departure, and is not further subdivided. This is centrally described herein, and not described again later.

Third, DL-AOD positioning method may be used.

The DL-AOD positioning method mainly depends on angle estimation information from a plurality of TRPs, and includes the following two operations:

1) angle measurement and reporting; and
2) location calculation.

Figure 2:
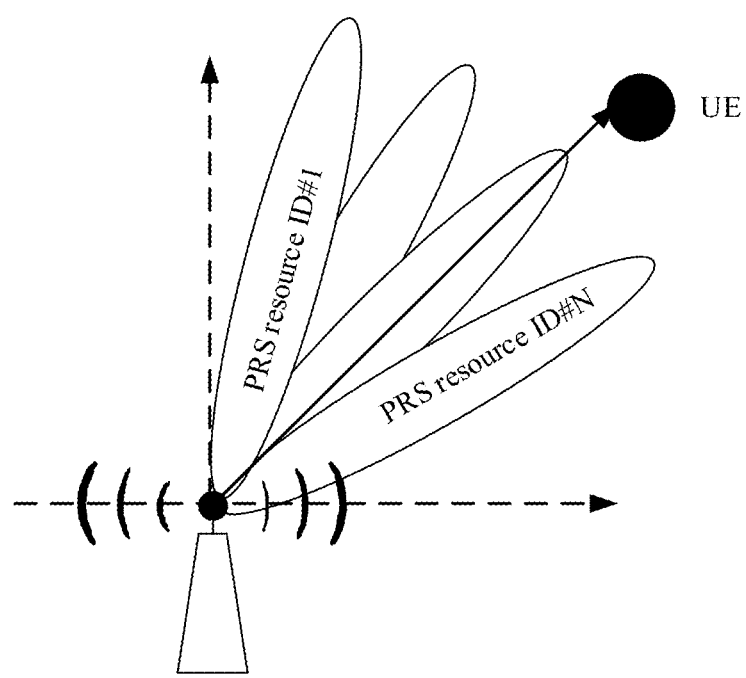
FIG. 2 is a schematic diagram of a UE-based AoD positioning scenario according to an embodiment of this application.
Figure 3:
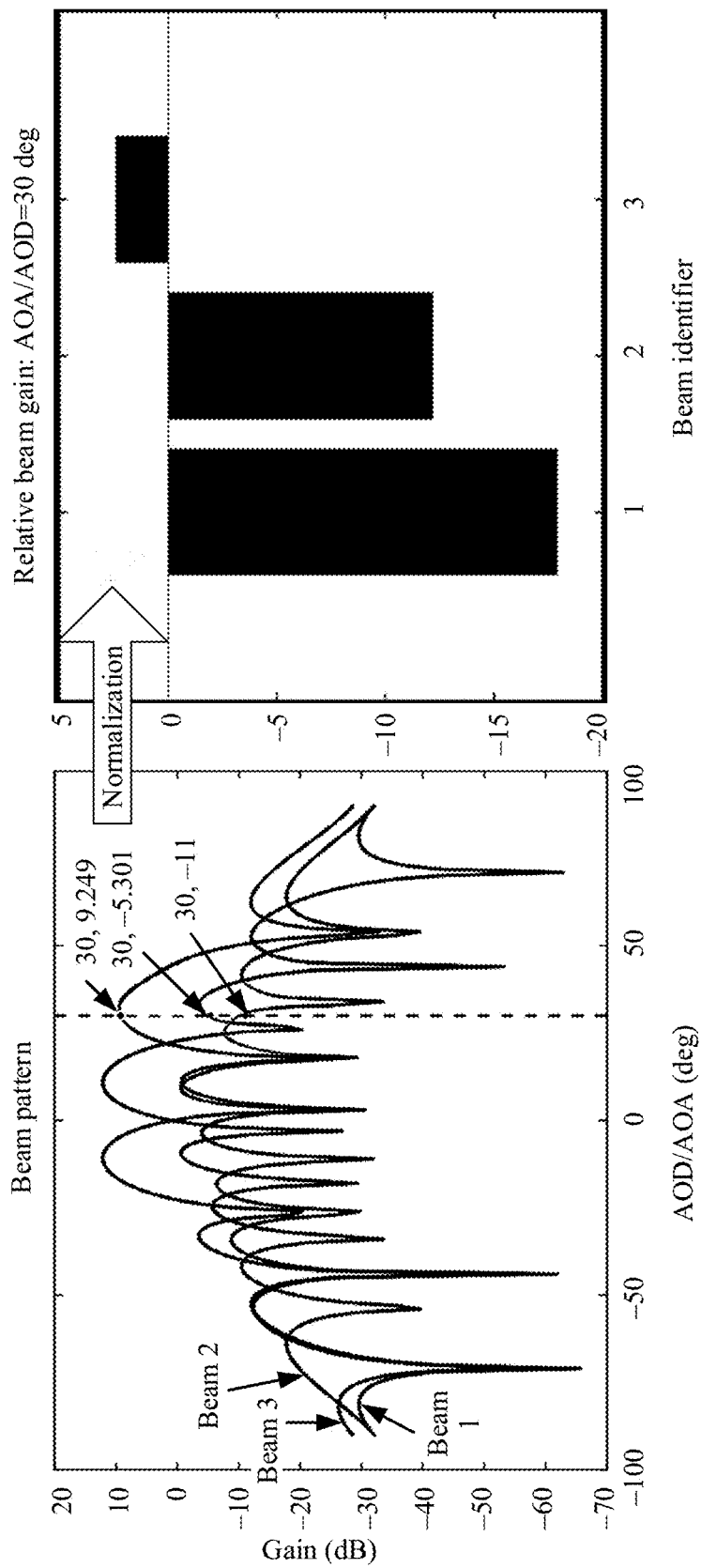
FIG. 3 is a schematic diagram of AOD estimation based on a relative beam gain according to an embodiment of this application.

As shown in FIG. 2, for a specific AOD, the UE may obtain a beam gain (equivalent to a fingerprint corresponding to the AOD) of each beam through measurement by sweeping each beam in a beam sweeping manner. A beam pattern may be formed by traversing values of the AoD, as shown in a left diagram in FIG. 3. For example, when the AoD is 30 degrees, beam gains obtained through measurement at a beam #1, a beam #2, and a beam #3 are −11 dB, −5.3 dB, and 9 dB respectively. To eliminate an unknown path loss, normalization processing may be performed on the beam gains. As shown in a right diagram in FIG. 3, relative gains of the three beams after the normalization processing may be considered as a relative gain envelope when the AoD is 30 degrees. Further, based on the beam gain measured at each beam, a maximum likelihood algorithm may be used to select an angle that best matches the relative gain envelope (equivalent to a prestored angle fingerprint database) to estimate a corresponding AoD value. For example, in the embodiments of this application, the beam gain may be, for example, reference signal received power (RSRP).

Figure 4:
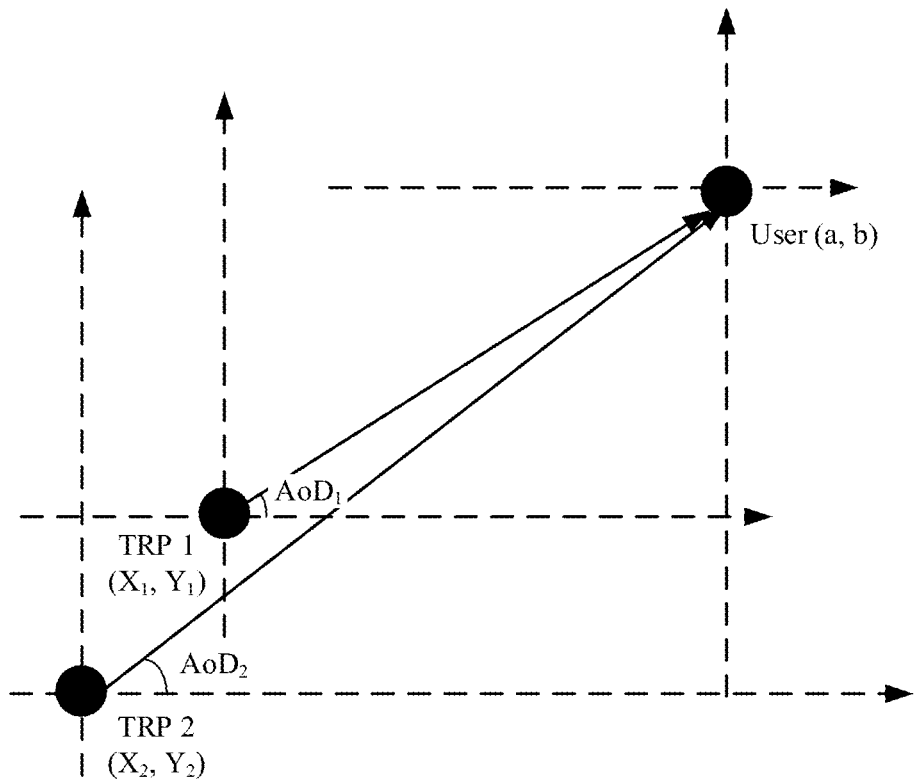
FIG. 4 is a schematic diagram of a DL-AOD positioning method according to an embodiment of this application.

Further, if geographical coordinate information of the TRP and the value of the AoD are obtained, the location of the user may be estimated. FIG. 4 is a schematic diagram of the DL-AOD positioning method in a two-dimensional plane. Based on angle information (AoD$_1$, AoD$_2$) estimated by using the foregoing method, geographical coordinate information (X$_1$,Y$_1$) of a TRP 1, geographical coordinate information (X$_2$,Y$_2$) of a TRP 2, and a triangle related theory, location coordinates (a,b) of the UE may be obtained by solving an equation of the following formula (1):

$$\begin{cases} \tan AoD_1 = \dfrac{X_1 - a}{Y_1 - b} \\ \tan AoD_2 = \dfrac{X_2 - a}{Y_2 - b} \end{cases} \quad \text{Formula(1)}$$

In the foregoing solution, the assistance data used to perform location calculations includes spatial direction information of a PRS resource, such as an azimuth, an elevation, or a beam width. However, only a coarse-grained angle range can be provided based on the assistance information in the solution, and high-accuracy positioning cannot be implemented. To achieve a high-accuracy positioning objective in Rel-17, new assistance data needs to be designed for accurate angle estimation.

The following describes the technical solutions in the embodiments of this application with reference to the accompanying drawings in the embodiments of this application.

The technical solutions in the embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, and a future 5th generation (5G) system or new radio (NR). The 5G mobile communication system used in this application includes a 5G mobile communication system with non-standalone (NSA) networking or a 5G mobile communication system with standalone (SA) networking. The technical solutions provided in this application are further applicable to a future communication system, for example, a 6th generation mobile communication system. Alternatively, the communication system may be a public land mobile network (PLMN), a device-to-device (D2D) communication system, a machine-to-machine (M2M) communication system, an internet of things (IoT) communication system, or another communication system.

Figure 5:
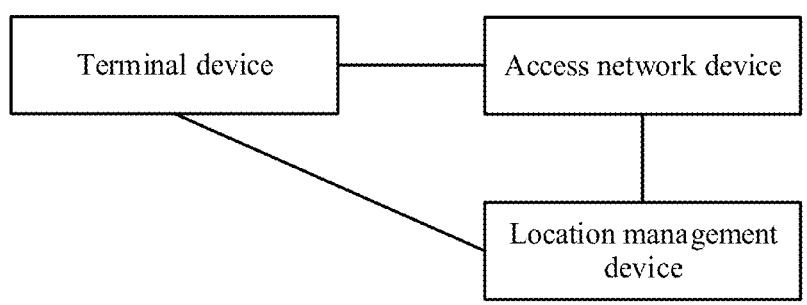
FIG. 5 is a schematic diagram of an architecture of a positioning system to which a positioning method according to an embodiment of this application is applied.

FIG. 5 is a schematic diagram of an architecture of a positioning system to which a positioning method according to an embodiment of this application is applied. As shown in FIG. 5, the positioning system includes a terminal device, one or more access network devices (one access network device is used as an example for illustration in FIG. 5), and a location management device. The terminal device, the access network device, and the location management device may directly communicate with each other, or may communicate with each other through forwarding by another device. This is not limited in this embodiment of this application. Although not shown, the positioning system may further include another network element such as a mobility management network element. This is not limited in this embodiment of this application.

In an embodiment, the terminal device receives a plurality of assistance data from the location management device, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle. Further, after the terminal device determines power information corresponding to one or more PRS resource identifiers which correspond to each of a plurality of to-be-measured angles, the terminal device positions the terminal device based on the plurality of assistance data and the power information corresponding to the one or more PRS resource identifiers at each of the plurality of to-be-measured angles. A detailed implementation of this solution is described in subsequent method embodiments, and details are not described herein.

In another possible implementation, the terminal device receives a plurality of assistance data from the one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle. Further, after the terminal device determines power information corresponding to one or more PRS resource identifiers which correspond to each of a plurality of to-be-measured angles, the terminal device positions the terminal device based on the plurality of assistance data and the power information corresponding to the one or more PRS resource identifiers at each of the plurality of to-be-measured angles. A detailed implementation of this solution is described in subsequent method embodiments, and details are not described herein.

Currently, only a rough range of an angle (angle of departure or angle of arrival) can be estimated based on existing assistance data, and high-accuracy positioning cannot be implemented. Based on the communication system provided in this embodiment of this application, the assistance data in this embodiment of this application includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, the terminal device can accurately estimate a to-be-measured angle (for example, an angle of departure or an angle of arrival) based on the plurality of assistance data and the power information corresponding to the one or more PRS resource identifiers at each of the plurality of to-be-measured angles, and can further implement high-accuracy positioning. According to another aspect, the communication system provided in this embodiment of this application provides an implementable solution to UE-based AoD positioning.

In some embodiments, the location management device in this embodiment of this application may be an LMF network element or a location management component (LMC) network element, or may be a local location management function (LLMF) network element located in a network device.

In some embodiments, the positioning system provided in this embodiment of this application is applicable to the foregoing various communication systems. A 5G mobile communication system is used as an example. A network element or an entity corresponding to the access network device in FIG. 5 may be a next-generation radio access network (NG-RAN) device in the 5G mobile communication system. The network element or entity corresponding to the mobility management network element may be an access and mobility management function (AMF) network element in the 5G mobile communication system. This is not limited in this embodiment of this application.

Figure 6:
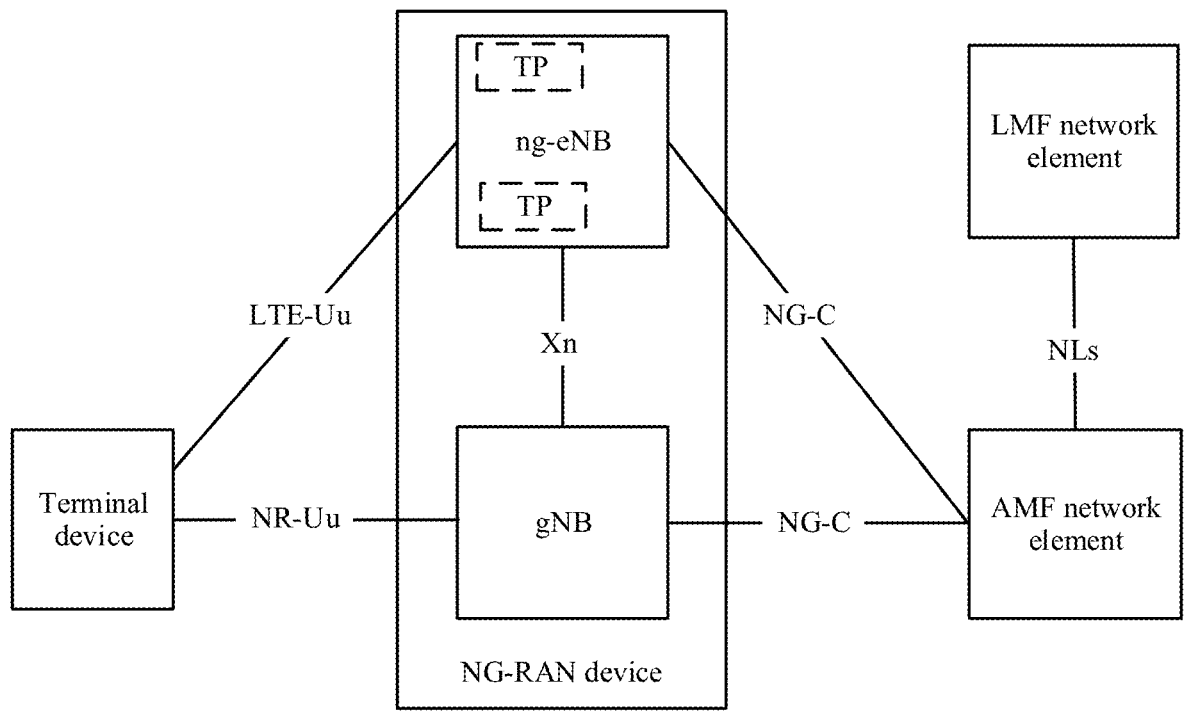
FIG. 6 is a schematic diagram of an architecture of a positioning system to which a positioning method according to an embodiment of this application is applied in a 5G mobile communication system.

For example, FIG. 6 is a schematic diagram of an architecture of a positioning system to which a positioning method according to an embodiment of this application is applied in a 5G mobile communication system. As shown in FIG. 6, in the positioning system, a terminal device is connected to a radio access network through a next-generation evolved NodeB (ng-eNB) and a next-generation NodeB (gNB) respectively by using an LTE-Uu interface and/or an NR-Uu interface. The radio access network is connected to a core network through an AMF network element by using an NG-C interface. The NG-RAN includes one or more ng-eNBs (one ng-eNB is used as an example for illustration in FIG. 6). Alternatively, the NG-RAN may include one or more gNBs (one gNB is used as an example for illustration in FIG. 6). Alternatively, the NG-RAN may include one or more ng-eNBs and one or more gNBs. The ng-eNB is an LTE base station that accesses a 5G core network, and the gNB is a 5G base station that accesses the 5G core network. The core network includes an AMF network element and an LMF network element. The AMF network element is configured to implement functions such as access management. The LMF network element is configured to implement functions such as positioning or positioning assistance. The AMF network element is connected to the LMF network element by using an NLs interface.

Figure 7:
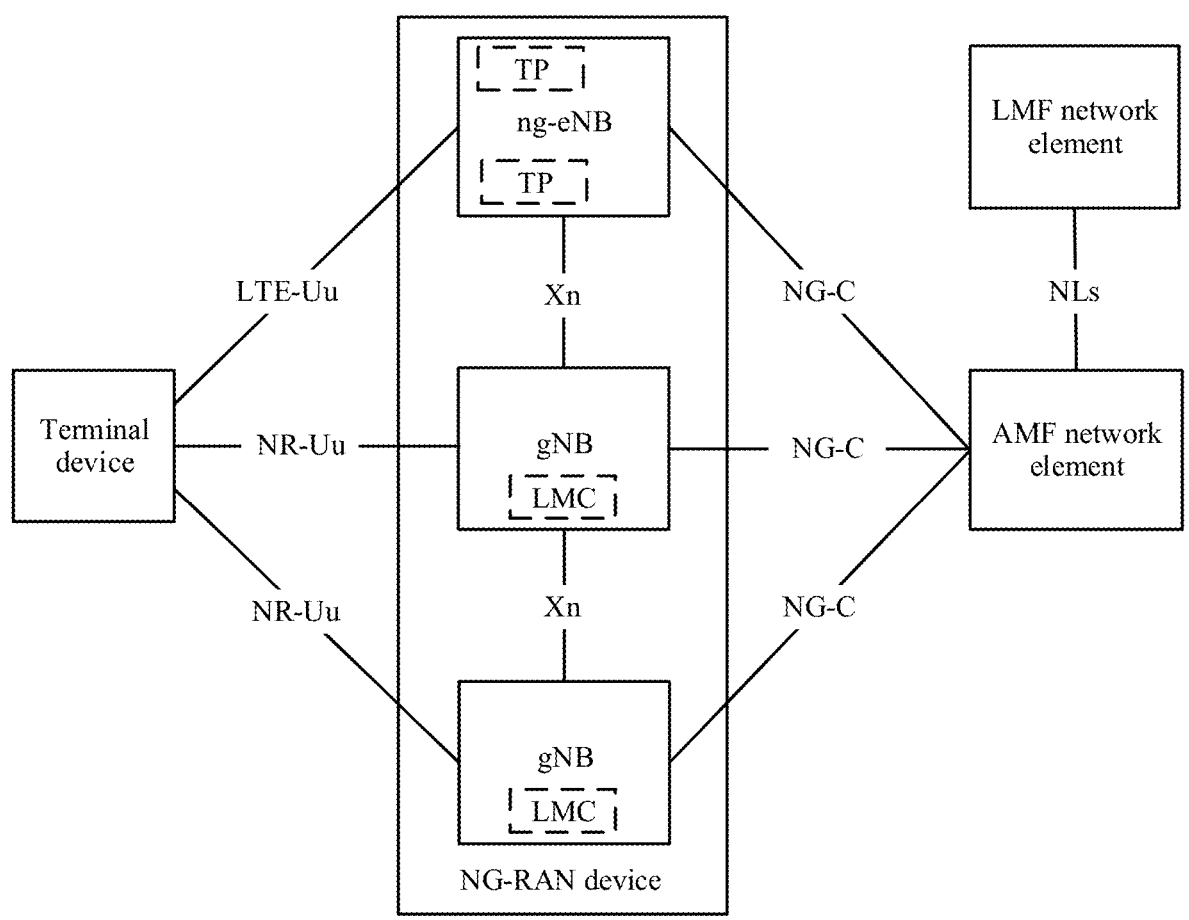
FIG. 7 is a schematic diagram of an architecture of another positioning system to which a positioning method according to an embodiment of this application is applied in a 5G mobile communication system.

For example, FIG. 7 is a schematic diagram of an architecture of another positioning system to which a positioning method according to an embodiment of this application is applied in a 5G mobile communication system. A difference between the architectures of the positioning systems in FIG. 7 and FIG. 6 lies in that a location management function apparatus or component (for example, an LMF network element) in FIG. 6 is deployed in a core network, but a location management function location apparatus or component (for example, an LMC network element) in FIG. 7 may be deployed in an NG-RAN device. As shown in FIG. 7, a gNB includes an LMC network element. The LMC network element is a part of a functional component of an LMF network element, and may be integrated into the gNB of the NG-RAN device.

It should be further understood that the device or function node included in the positioning system in FIG. 6 or FIG. 7 is merely an example for description, and does not constitute a limitation on the embodiments of this application. The positioning system in FIG. 6 or FIG. 7 may further include another network element, device, or function node that has an interaction relationship with the device or function node shown in the figure. This is not limited herein.

In some embodiments, the terminal device (terminal equipment) in the embodiments of this application may be an access terminal, a subscriber unit, a subscriber station, a mobile station, a mobile station, a relay station, a remote station, a remote terminal, a mobile device, a user terminal (user terminal), UE, a terminal (terminal), a wireless communication device, a user agent, a user apparatus, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved PLMN, a terminal device in a future Internet of Vehicles, or the like. This is not limited in the embodiments of this application.

As an example rather than a limitation, in the embodiments of this application, the terminal may be a mobile phone, a tablet computer, a computer with a radio transceiver function, a virtual reality terminal device, an augmented reality terminal device, a wireless terminal in industrial control, a wireless terminal in unmanned driving, a wireless terminal in remote surgery, a wireless terminal in a smart grid, a wireless terminal in transportation safety, a wireless terminal in a smart city, or a wireless terminal in a smart home.

As an example rather than a limitation, in the embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn on a body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in the embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In the embodiments of this application, an IoT technology may implement massive connections, deep coverage, and terminal power saving by using, for example, a narrow band (NB) technology.

In addition, in this application, the terminal device may further include a sensor, for example, an intelligent printer, a train detector, or a gas station. Main functions of the terminal device include: collecting data (for some terminal devices), receiving control information and downlink data of an access network device, sending electromagnetic waves, and transmitting uplink data to the access network device.

In some embodiments, the access network device in the embodiments of this application may be any communication device configured to communicate with the terminal device and having a radio transceiver function. The access network device includes but is not limited to an evolved NodeB (eNB), a baseband unit (BBU), an access point (AP) in a wireless fidelity (Wi-Fi) system, a wireless relay node, a wireless backhaul node, a transmission point (TP), a TRP, or the like. Alternatively, the access network device may be a gNB, a TRP, or a TP in a 5G system, or one antenna panel or a group of antenna panels (including a plurality of antenna panels) of a base station in a 5G system. In addition, the access network device may alternatively be a network node that constitutes a gNB or a TP, for example, a BBU or a distributed unit (DU).

In some deployments, the gNB may include a centralized unit (CU) and a DU. In addition, the gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node.

In some embodiments, in the embodiments of this application, communication between the access network device and the terminal device may be performed by using a licensed spectrum, communication may be performed by using an unlicensed spectrum, or communication may be performed by using both a licensed spectrum and an unlicensed spectrum. The access network device and the terminal device may communicate with each other by using a spectrum below 6 gigahertz (GHz), or may communicate with each other by using a spectrum above 6 GHz, or may communicate with each other by using both a spectrum below 6 GHz and a spectrum above 6 GHz. Spectrum resources used between the access network device and the terminal device are not limited in the embodiments of this application.

In some embodiments, the terminal device, the access network device, or the location management device in the embodiments of this application may be deployed on land, for example, in an indoor, outdoor, handheld, or vehicle-mounted application scenario, or may be deployed on water, or may be deployed on an aircraft, such as an airplane or a balloon, or deployed on a satellite. An application scenario of the terminal device, the access network device, or the location management device is not limited in the embodiments of this application.

In some embodiments, in the embodiments of this application, the terminal device, the access network device, or the location management device includes a hardware layer, an operating system layer that runs on the hardware layer, and an application layer that runs on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software. In addition, the embodiments of this application do not particularly limit a specific structure of an execution body of the method provided in the embodiments of this application, as long as communication can be performed according to the method provided in the embodiments of this application by running a program that records code of the method provided in the embodiments of this application. For example, the execution body of the method provided in the embodiments of this application may be the terminal device, the access network device, or the location management device, or a functional module that is in the terminal device, the access network device, or the location management device and capable of invoking the program and executing the program.

In other words, related functions of the terminal device, the access network device, or the location management device in the embodiments of this application may be implemented by one device, or may be implemented by a plurality of devices together, or may be implemented by one or more functional modules in one device. This is not limited in the embodiments of this application. It can be understood that the foregoing function may be a network element on a hardware device, or may be a software function running on dedicated hardware, or may be a combination of hardware and software, or may be a virtualization function instantiated on a platform (for example, a cloud platform).

Figure 8:
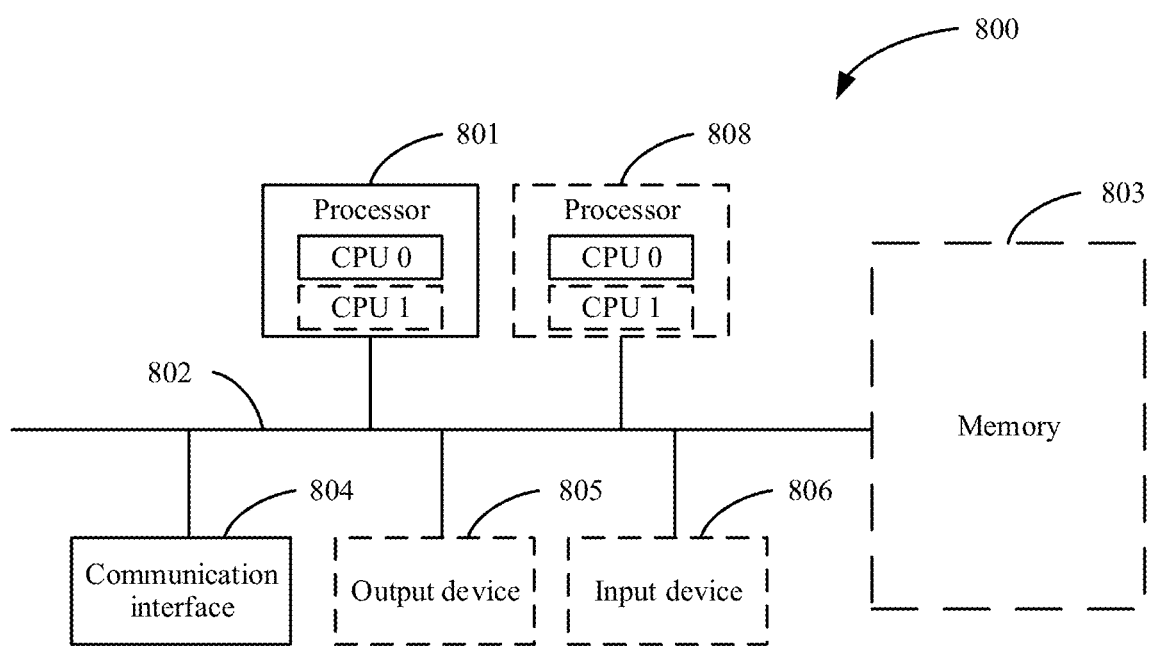
FIG. 8 is a schematic diagram of a structure of a communication apparatus according to an embodiment of this application.

For example, related functions of the terminal device, the access network device, or the location management device in the embodiments of this application may be implemented by a communication apparatus 800 in FIG. 8. FIG. 8 is a schematic diagram of a structure of a communication apparatus 800 according to an embodiment of this application. The communication apparatus 800 includes one or more processors 801, a communication line 802, and at least one communication interface (in FIG. 8, only an example in which a communication interface 804 and one processor 801 are included is used for description). In some embodiments, the communication apparatus 800 may further include a memory 803.

The processor 801 may be a CPU, a microprocessor, an application-specific integrated circuit (ASIC), or one or more integrated circuits configured to control program execution in the solution of this application.

The communication line 802 may include a path for connecting different components.

The communication interface 804 may be a transceiver module configured to communicate with another device or a communication network, for example, the Ethernet, an RAN, or a wireless local area network (WLAN). For example, the transceiver module may be an apparatus such as a transceiver or a transceiver. In some embodiments, the communication interface 804 may alternatively be a transceiver circuit located in the processor 801, to implement signal input and signal output of the processor.

The memory 803 may be an apparatus having a storage function. The memory 1002 may be a read-only memory (ROM), a static storage device in another type that can store static information and instructions, a random access memory (RAM), or a dynamic storage device in another type that can store information and instructions; or may be an electrically erasable programmable read-only memory (EEPROM), a compact disc read-only memory (CD-ROM), or another compact disc storage or optical disc storage (including a compact disc, a laser disc, an optical disc, a digital versatile disc, a Blu-ray disc, and the like), a magnetic disk storage medium, another magnetic storage device, or any other medium that can be used to carry or store desired program code in a form of an instruction or a data structure and that is accessible to a computer. However, the memory 803 is not limited thereto. The memory may stand alone and is connected to the processor through the communication line 802. The memory may alternatively be integrated with the processor.

The memory 803 is configured to store computer-executable instructions for executing the solution of this application, and the processor 801 controls execution of the computer-executable instructions. The processor 801 is configured to execute the computer-executable instructions stored in the memory 803, to implement the positioning method provided in the embodiments of this application.

Alternatively, in this embodiment of this application, the processor 801 may execute processing-related functions in a positioning method provided in the following embodiments of this application, and the communication interface 804 is responsible for communicating with another device or a communication network. This is not limited in this embodiment of this application.

The computer-executable instructions in this embodiment of this application may also be referred to as application program code. This is not limited in this embodiment of this application.

In specific implementation, in one embodiment, the processor 801 may include one or more CPUs, for example, a CPU 0 and a CPU 1 in FIG. 8.

In specific implementation, in one embodiment, the apparatus 800 may include a plurality of processors, for example, the processor 801 and a processor 808 in FIG. 8. Each of the processors may be a single-core (single-CPU) processor or a multi-core (multi-CPU) processor. The processor herein may refer to one or more devices, circuits, and/or processing cores configured to process data (for example, computer program instructions).

In specific implementation, in an embodiment, the communication apparatus 800 may further include an output device 805 and an input device 806. The output device 805 communicates with the processor 801, and may display information in a plurality of manners.

The communication apparatus 800 may be a general-purpose apparatus or a dedicated apparatus. For example, the communication apparatus 800 may be a desktop computer, a portable computer, a network server, a personal digital assistant (PDA), a mobile phone, a tablet computer, a wireless terminal device, an embedded device, or a device having a structure similar to that in FIG. 8. A type of the communication apparatus 800 is not limited in this embodiment of this application.

With reference to FIG. 1 to FIG. 8, the following describes in detail the positioning method provided in the embodiments of this application.

It should be noted that names of messages between network elements, names of parameters in the messages, or the like in the following embodiments of this application are merely examples, and there may be other names in a specific implementation. This is not limited in embodiments of this application.

First, assistance data added in the embodiments of this application relative to assistance data in an existing positioning method is described as follows:

The assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle.

For example, a form of the assistance data may be shown in Table 1.

TABLE 1

| Angle | PRS resource identifier | Power info |
|---|---|---|
| AOD#1 | ID1 | Power information corresponding to an ID1_#1 |
|  | ID2 | Power information corresponding to an ID2_#1 |
|  | ID3 | Power information corresponding to an ID3_#1 |
|  | . . . | . . . |
| AOD#2 | ID1 | Power information corresponding to an ID1_#2 |
|  | ID2 | Power information corresponding to an ID2_#2 |
|  | ID3 | Power information corresponding to an ID3_#2 |
|  | . . . | . . . |
| . . . | . . . | . . . |

In an embodiment, in the embodiments of this application, the power information corresponding to each PRS resource identifier at the corresponding preset angle includes a power value corresponding to each PRS resource identifier at the corresponding preset angle.

In some embodiments, the power value in the embodiments of this application may be a power value obtained through actual measurement, or may be a power value after normalization processing is performed on a power value obtained through actual measurement to eliminate an unknown path loss. This is centrally described herein, and not limited in the embodiments of this application. For a manner of performing normalization processing on the power value obtained through actual measurement to eliminate the unknown path loss, refer to the conventional technology. Details are not described herein.

In some embodiments, the power value in the embodiments of this application includes a radiated power value, a received power value, or another power value. This is centrally described herein, and not limited in the embodiments of this application. For example, the radiated power value or the received power value may be, for example, an RSRP value, reference signal received quality (RSRQ), a received signal strength indicator (RSSI), or a signal to interference plus noise ratio or signal to noise ratio (SINR/SNR). This is not limited in the embodiments of this application.

In another possible implementation, in the embodiments of this application, the power information corresponding to each PRS resource identifier at the corresponding preset angle includes a value obtained after the power value corresponding to each PRS resource identifier at the corresponding preset angle is compressed. In this manner, because the power value corresponding to each PRS resource identifier at the corresponding preset angle is compressed, signaling overheads can be reduced during transmission of the assistance data, and a positioning latency and power consumption can be reduced.

A plurality of methods is available for compressing the power value corresponding to each PRS resource identifier at the corresponding preset angle. In the embodiments of this application, two compression methods are provided as examples: a lossless compression method and a lossy compression method.

The lossless compression method may include the following two compression scenarios.

Scenario 1: The power information corresponding to each PRS resource identifier at the corresponding preset angle includes a value relative to a reference first power value, for the power value corresponding to each PRS resource identifier at the corresponding preset angle. The first power value is a largest one of power values corresponding to the one or more PRS resource identifiers at the corresponding preset angle. In other words, the first power value is a largest value obtained after the power values corresponding to the one or more PRS resource identifiers at the corresponding preset angle are sorted at the corresponding preset angle.

The value relative to the reference first power value, for the power value corresponding to each PRS resource identifier at the corresponding preset angle, may be implemented by using the following difference method or quotient method.

In the difference method, power values corresponding to all PRS resource identifiers at the corresponding preset angle are first sorted (for example, the power values may be in ascending order or descending order); and then by using a largest one (that is, the foregoing first power value) of the power values corresponding to the one or more PRS resource identifiers at the corresponding preset angle as a reference, subtraction is performed between the first power value and the power value corresponding to each PRS resource identifier at the corresponding preset angle to obtain a difference (rounded to an integer), where the difference may be used as the power information corresponding to each PRS resource identifier at the corresponding preset angle.

For example, it is assumed that in a plurality of groups of mapping relationships corresponding to a plurality of angles, power values corresponding to PRS resource identifiers in each group of mapping relationships at a corresponding preset angle are shown in Table 2.

TABLE 2

| Angle | PRS resource identifier | Power value |
|---|---|---|
| AOD#1 = 2° | ID1 | 9.5 |
| | ID2 | 5.6 |

TABLE 2-continued

| Angle | PRS resource identifier | Power value |
|---|---|---|
| | ID3 | 3 |
| | ID4 | 12.1 |
| AOD#2 = 4° | ID1 | 4.1 |
| | ID2 | 11.5 |
| | ID3 | 2 |
| | ID4 | 6.7 |

Using sorting in descending order as an example, when AOD#1=2°, a result obtained after power values corresponding to a plurality of PRS resource identifiers are sorted at the corresponding preset angle is {12.1, 9.5, 5.6, 3}. Further, by using 12.1 as a reference, subtraction is performed between 12.1 and the power value corresponding to each PRS resource identifier at the corresponding preset angle (results are rounded to integers), so that power information corresponding to the plurality of PRS resource identifiers at AOD#1=2° can be obtained, as shown in Table 3.

Similarly, using sorting in descending order as an example, when AOD#2=4°, a result obtained after power values corresponding to the plurality of PRS resource identifiers are sorted at the corresponding preset angle is {11.5, 6.7, 4.1, 2}. Further, by using 11.5 as a reference, subtraction is performed between 11.5 and the power value corresponding to each PRS resource identifier at the corresponding preset angle (results are rounded to integers), so that power information corresponding to the plurality of PRS resource identifiers at AOD#2=4° can be obtained, as shown in Table 3.

TABLE 3

| Angle | PRS resource identifier | Power info |
|---|---|---|
| AOD#1 = 2° | ID1 | 3 |
| | ID2 | 7 |
| | ID3 | 9 |
| | ID4 | 0 |
| AOD#2 = 4° | ID1 | 7 |
| | ID2 | 0 |
| | ID3 | 10 |
| | ID4 | 5 |

It should be noted that Table 3 is described by using an example in which the power value corresponding to each PRS resource identifier at the corresponding preset angle is subtracted from the first power value. The first power value may alternatively be subtracted from the power value corresponding to each PRS resource identifier at the corresponding preset angle, and a result is shown in Table 4. This is not limited in the embodiments of this application.

TABLE 4

| Angle | PRS resource identifier | Power info |
|---|---|---|
| AOD#1 = 2° | ID1 | −3 |
| | ID2 | −7 |
| | ID3 | −9 |
| | ID4 | 0 |
| AOD#2 = 4° | ID1 | −7 |
| | ID2 | 0 |
| | ID3 | −10 |
| | ID4 | −5 |

In the quotient method, power values corresponding to all PRS resource identifiers at the corresponding preset angle are first sorted (for example, the power values may be in ascending order or descending order); and then by using a largest one (that is, the foregoing first power value) of the power values corresponding to the one or more PRS resource identifiers at the corresponding preset angle as a reference, division is performed between the first power value and the power value corresponding to each PRS resource identifier at the corresponding preset angle, to obtain a quotient and a remainder (rounded to integers), where the quotient and the remainder may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD#1=2°, a result obtained after power values corresponding to a plurality of PRS resource identifiers are sorted at the corresponding preset angle is {12.1, 9.5, 5.6, 3}. Further, by using 12.1 as a reference, division is performed between 12.1 and the power value corresponding to each PRS resource identifier at the corresponding preset angle (results are rounded to integers), so that power information corresponding to the plurality of PRS resource identifiers at AOD#1=2° can be obtained, as shown in Table 5.

Similarly, using sorting in descending order as an example, when AOD#2=4°, a result obtained after power values corresponding to the plurality of PRS resource identifiers are sorted at the corresponding preset angle is {11.5, 6.7, 4.1, 2}. Further, by using 11.5 as a reference, division is performed between 11.5 and the power value corresponding to each PRS resource identifier at the corresponding preset angle (results are rounded to integers), so that power information corresponding to the plurality of PRS resource identifiers at AOD#2=4° can be obtained, as shown in Table 5.

TABLE 5

| Angle | PRS resource identifier | Power info |
| --- | --- | --- |
| AOD#1 = 2° | ID1 | (1, 3) |
|  | ID2 | (2, 1) |
|  | ID3 | (4, 0) |
|  | ID4 | (1, 0) |
| AOD#2 = 4° | ID1 | (2, 3) |
|  | ID2 | (1, 0) |
|  | ID3 | (6, 0) |
|  | ID4 | (1, 5) |

It should be noted that Table 5 is described by using an example in which the first power value is divided by the power value corresponding to each PRS resource identifier at the corresponding preset angle. The power value corresponding to each PRS resource identifier at the corresponding preset angle may alternatively be divided by the first power value. This is not limited in the embodiments of this application.

Scenario 2: The power information corresponding to each PRS resource identifier at the corresponding preset angle includes a value relative to a reference second power value, for the power value corresponding to each PRS resource identifier at the corresponding preset angle. The second power value is a largest one of power values corresponding to different PRS resource identifiers at the one or more preset angles at the corresponding preset angle. In other words, the second power value is a largest value obtained after the power values corresponding to the one or more PRS resource identifiers at the corresponding preset angle are sorted at all preset angles.

The value relative to the reference second power value, for the power value corresponding to each PRS resource identifier at the corresponding preset angle, may be implemented by using the following difference method or quotient method.

In the difference method, power values corresponding to different PRS resource identifiers at the one or more preset angles at the corresponding preset angle are first sorted (for example, the power values may be in ascending order or descending order); and then by using a largest one (that is, the foregoing second power value) of the power values corresponding to the different PRS resource identifiers at the one or more angles at the corresponding preset angle as a reference, subtraction is performed between the second power value and the power value corresponding to each PRS resource identifier at the corresponding preset angle to obtain a difference (rounded to an integer), where the difference may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD#1=2° and AOD#2=4°, a result obtained after power values corresponding to a plurality of PRS resource identifiers are sorted at the corresponding preset angle is {12.1, 11.5, 9.5, 6.7, 5.6, 4.1, 3, 2}. Further, by using 12.1 as a reference, subtraction is performed between 12.1 and the power value corresponding to each PRS resource identifier at the corresponding preset angle (results are rounded to integers), so that power information corresponding to the plurality of PRS resource identifiers at AOD#1=2° can be obtained, as shown in Table 6.

TABLE 6

| Angle | PRS resource identifier | Power info |
| --- | --- | --- |
| AOD#1 = 2° | ID1 | 3 |
|  | ID2 | 7 |
|  | ID3 | 9 |
|  | ID4 | 0 |
| AOD#2 = 4° | ID1 | 8 |
|  | ID2 | 1 |
|  | ID3 | 10 |
|  | ID4 | 5 |

It should be noted that Table 6 is described by using an example in which the power value corresponding to each PRS resource identifier at the corresponding preset angle is subtracted from the second power value. The second power value may alternatively be subtracted from the power value corresponding to each PRS resource identifier at the corresponding preset angle. This is not limited in the embodiments of this application.

In the quotient method, power values corresponding to different PRS resource identifiers at the one or more preset angles at the corresponding preset angle are first sorted (for example, the power values may be in ascending order or descending order); and then by using a largest one (that is, the foregoing second power value) of the power values corresponding to the different PRS resource identifiers at the one or more angles at the corresponding preset angle as a reference, division is performed between the second power value and the power value corresponding to each PRS resource identifier at the corresponding preset angle to obtain a quotient and a remainder (rounded to integers), where the quotient and the remainder may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD#1=2° and AOD#2=4°, a result obtained after power values corresponding to a plurality of PRS resource identifiers are sorted at the corresponding preset angle is {12.1, 11.5, 9.5, 6.7, 5.6, 4.1, 3, 2}. Further, by using 12.1 as a reference, division is performed between 12.1 and the power value corresponding to each PRS resource identifier at the corresponding preset angle (results are rounded to integers), so that power information corresponding to the plurality of PRS resource identifiers at AOD#1=2° and AOD#2=4° can be obtained, as shown in Table 7.

TABLE 7

| Angle | PRS resource identifier | Power info |
| --- | --- | --- |
| AOD#1 = 2° | ID1 | (1, 3) |
|  | ID2 | (2, 1) |
|  | ID3 | (4, 0) |
|  | ID4 | (1, 0) |
| AOD#2 = 4° | ID1 | (3, 0) |
|  | ID2 | (1, 1) |
|  | ID3 | (6, 0) |
|  | ID4 | (1, 5) |

It should be noted that Table 7 is described by using an example in which the second power value is divided by the power value corresponding to each PRS resource identifier at the corresponding preset angle. The power value corresponding to each PRS resource identifier at the corresponding preset angle may alternatively be divided by the second power value. This is not limited in the embodiments of this application.

The lossy compression method may include the following two compression scenarios.

Scenario 3: The power information corresponding to each PRS resource identifier at the corresponding preset angle includes a value relative to a reference previous power value, for the power value corresponding to each PRS resource identifier at the corresponding preset angle. Power values corresponding to the one or more PRS resource identifiers at the corresponding preset angle are sorted in ascending order or descending order. In other words, the power values corresponding to the one or more PRS resource identifiers at the corresponding preset angle are sorted at the corresponding preset angle.

The value relative to the reference previous power value, for the power value corresponding to each PRS resource identifier at the corresponding preset angle, may be implemented by using the following differential method or differential quotient method.

In the differential method, power values corresponding to all PRS resource identifiers at the corresponding preset angle are first sorted (for example, the power values may be in ascending order or descending order); and then subtraction is performed between a previous power value and a next power value to obtain a difference (rounded to an integer), where the difference may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD#1=2°, a result obtained after power values corresponding to a plurality of PRS resource identifiers are sorted at the corresponding preset angle is {12.1, 9.5, 5.6, 3}. Further, subtraction is performed between the previous power value and the next power value (the result is rounded to an integer), so that power information corresponding to the plurality of PRS resource identifiers at AOD#1=2° and AOD#2=4° can be obtained, as shown in Table 8.

Similarly, using sorting in descending order as an example, when AOD#2=4°, a result obtained after power values corresponding to the plurality of PRS resource identifiers are sorted at the corresponding preset angle is {11.5, 6.7, 4.1, 2}. Further, subtraction is performed between the previous power value and the next power value (the result is rounded to an integer), so that power information corresponding to the plurality of PRS resource identifiers at AOD#2=4° can be obtained, as shown in Table 8.

TABLE 8

| Angle | PRS resource identifier | Power info |
| --- | --- | --- |
| AOD#1 = 2° | ID1 | 3 |
|  | ID2 | 3 |
|  | ID3 | 3 |
|  | ID4 | 0 |
| AOD#2 = 4° | ID1 | 3 |
|  | ID2 | 0 |
|  | ID3 | 2 |
|  | ID4 | 5 |

It should be noted that, to avoid error accumulation, in the embodiments of this application, the previous power value may be a compressed power value. For example, when AOD#1=2°, the power information 3 corresponding to the ID2 is not obtained by directly subtracting a third power value (5.6) from a second power value (9.5), but obtained by directly subtracting the third power value (5.6) from a compressed second power value (9). This is centrally described herein, and not described again later.

It should be noted that Table 8 is described by using an example in which the next power value is subtracted from the previous power value after the power values are sorted in descending order. The previous power value may alternatively be subtracted from the next power value after the power values are sorted in descending order. Alternatively, the next power value may be subtracted from the previous power value after the power values are sorted in ascending order. Alternatively, the previous power value may be subtracted from the next power value after the power values are sorted in ascending order. This is not limited in the embodiments of this application.

In the differential quotient method, power values corresponding to all PRS resource identifiers at the corresponding preset angle are first sorted (for example, the power values may be in ascending order or descending order); and then division is performed between a previous power value and a next power value to obtain a quotient and a remainder (rounded to integers), where the quotient and the remainder may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD#1=2°, a result obtained after power values corresponding to a plurality of PRS resource identifiers are sorted at the corresponding preset angle is {12.1, 9.5, 5.6, 3}. Further, subtraction is performed between the previous power value and the next power value (the result is rounded to an integer), so that power information corresponding to the plurality of PRS resource identifiers at AOD#1=2° can be obtained, as shown in Table 9.

Similarly, using sorting in descending order as an example, when AOD#2=4°, a result obtained after power values corresponding to the plurality of PRS resource identifiers are sorted at the corresponding preset angle is {11.5, 6.7, 4.1, 2}. Further, subtraction is performed between the previous power value and the next power value (the result is rounded to an integer), so that power information corresponding to the plurality of PRS resource identifiers at AOD#2=4° can be obtained, as shown in Table 9.

TABLE 9

| Angle | PRS resource identifier | Power info |
|---|---|---|
| AOD#1 = 2° | ID1 | (1, 3) |
|  | ID2 | (1, 3) |
|  | ID3 | (2, 0) |
|  | ID4 | (1, 0) |
| AOD#2 = 4° | ID1 | (1, 3) |
|  | ID2 | (1, 0) |
|  | ID3 | (2, 0) |
|  | ID4 | (1, 5) |

It should be noted that Table 9 is described by using an example in which the previous power value is divided by the next power value after the power values are sorted in descending order. The next power value may be divided by the previous power value after the power values are sorted in descending order. Alternatively, the previous power value may be divided by the next power value after the power values are sorted in ascending order. Alternatively, the next power value may be divided by the previous power value after the power values are sorted in ascending order. This is not limited in the embodiments of this application.

Scenario 4: The power information corresponding to each PRS resource identifier at the corresponding preset angle includes a value relative to a reference previous power value, for the power value corresponding to each PRS resource identifier at the corresponding preset angle. Power values corresponding to different PRS resource identifiers at the one or more preset angles at the corresponding preset angle are sorted in ascending order or descending order. In other words, the power values corresponding to the one or more PRS resource identifiers at the corresponding preset angle are sorted at all preset angles.

The value relative to the reference previous power value, for the power value corresponding to each PRS resource identifier at the corresponding preset angle, may be implemented by using the following differential method or differential quotient method.

In the differential method, power values corresponding to different PRS resource identifiers at the one or more preset angles at the corresponding preset angle are first sorted (for example, the power values may be in ascending order or descending order); and then subtraction is performed between a previous power value and a next power value to obtain a difference (rounded to an integer), where the difference may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD#1=2° and AOD#2=4°, a result obtained after power values corresponding to a plurality of PRS resource identifiers are sorted at the corresponding preset angle is {12.1, 11.5, 9.5, 6.7, 5.6, 4.1, 3, 2}. Further, subtraction is performed between the previous power value and the next power value (the result is rounded to an integer), so that power information corresponding to the plurality of PRS resource identifiers at AOD#1=2° and AOD#2=4° can be obtained, as shown in Table 10.

TABLE 10

| Angle | PRS resource identifier | Power info |
|---|---|---|
| AOD#1 = 2° | ID1 | 2 |
|  | ID2 | 1 |
|  | ID3 | 1 |
|  | ID4 | 0 |
| AOD#2 = 4° | ID1 | 2 |
|  | ID2 | 1 |
|  | ID3 | 1 |
|  | ID4 | 2 |

It should be noted that Table 10 is described by using an example in which the next power value is subtracted from the previous power value after the power values are sorted in descending order. The previous power value may alternatively be subtracted from the next power value after the power values are sorted in descending order. Alternatively, the next power value may be subtracted from the previous power value after the power values are sorted in ascending order. Alternatively, the previous power value may be subtracted from the next power value after the power values are sorted in ascending order. This is not limited in the embodiments of this application.

In the differential quotient method, power values corresponding to different PRS resource identifiers at the one or more preset angles at the corresponding preset angle are first sorted (for example, the power values may be in ascending order or descending order); and then division is performed between a previous power value and a next power value to obtain a quotient and a remainder (rounded to integers), where the quotient and the remainder may be used as the power information corresponding to each PRS resource identifier at the corresponding preset angle.

For example, it is assumed that in a plurality of groups of mapping relationships corresponding to a plurality of preset angles, power values corresponding to PRS resource identifiers in each group of mapping relationships at a corresponding preset angle are shown in the foregoing Table 2. Using sorting in descending order as an example, when AOD#1=2° and AOD#2=4°, a result obtained after power values corresponding to a plurality of PRS resource identifiers are sorted at the corresponding preset angle is {12.1, 11.5, 9.5, 6.7, 5.6, 4.1, 3, 2}. Further, division is performed between the previous power value and the next power value (the result is rounded to an integer), so that power information corresponding to the plurality of PRS resource identifiers at AOD#1=2° and AOD#2=4° can be obtained, as shown in Table 11.

TABLE 11

| Angle | PRS resource identifier | Power info |
| --- | --- | --- |
| AOD#1 = 2° | ID1 | (1, 2) |
| | ID2 | (1, 1) |
| | ID3 | (1, 1) |
| | ID4 | (1, 0) |
| AOD#2 = 4° | ID1 | (1, 2) |
| | ID2 | (1, 1) |
| | ID3 | (1, 1) |
| | ID4 | (1, 2) |

It should be noted that Table 11 is described by using an example in which the previous power value is divided by the next power value after the power values are sorted in descending order. The next power value may be divided by the previous power value after the power values are sorted in descending order. Alternatively, the previous power value may be divided by the next power value after the power values are sorted in ascending order. Alternatively, the next power value may be divided by the previous power value after the power values are sorted in ascending order. This is not limited in the embodiments of this application.

It should be understood that, in the foregoing scenario 4, after the differential method or the differential quotient method is used to determine the value relative to the reference previous power value, for the power value corresponding to each PRS resource identifier at the corresponding preset angle, an order of presentation of each group of mapping relationships in the assistance data should also be based on a power value sorting result. In other words, using the foregoing Table 10 as an example, the order of presentation of each group of mapping relationships in the assistance data during transmission may be shown in Table 12. Therefore, it is convenient to sequentially restore the power value corresponding to each PRS resource identifier at the corresponding preset angle. This is centrally described herein, and not described again later.

TABLE 12

| Angle | PRS resource identifier | Power info |
| --- | --- | --- |
| AOD#1 = 2° | ID4 | 0 |
| AOD#2 = 4° | ID2 | 1 |
| AOD#1 = 2° | ID1 | 2 |
| AOD#2 = 4° | ID4 | 2 |
| AOD#1 = 2° | ID2 | 1 |
| AOD#2 = 4° | ID1 | 2 |
| AOD#1 = 2° | ID3 | 1 |
| AOD#2 = 4° | ID3 | 1 |

It should be understood that the foregoing provides only several methods for compressing the power value corresponding to each PRS resource identifier at the corresponding preset angle, and does not constitute a limitation on the technical solutions provided in the embodiments of this application. A person skilled in the art may understand that another compression method may also be available, so that after compression is performed on the assistance data, signaling overheads can be reduced during transmission of the assistance data. This is not limited in the embodiments of this application.

It should be understood that, when a plurality of compression methods are available, different compression methods may be selected based on a distribution status or compression requirements of the power values corresponding to the plurality of PRS resource identifiers at the corresponding preset angle, and each compression method may be used for a plurality of times or may be used in combination with other compression methods. For example, the differential method or the differential quotient method is applicable to a case in which a difference between values is relatively large. Because a smaller compressed value can be obtained in this way, signaling overheads are reduced to a greater extent.

It should be understood that, in the solution in which the power values corresponding to the one or more PRS resource identifiers at the corresponding preset angle are sorted at the corresponding preset angle, the first power value may not need to be transmitted during transmission of the assistance data. This is because when determining power information corresponding to one or more PRS resource identifiers which correspond to each of a plurality of to-be-measured angles, a positioning device (for example, a terminal device in the following embodiments of this application) may determine the power information based on a sorting result after power values corresponding to the one or more PRS resource identifiers at the corresponding to-be-measured angle are sorted at the corresponding to-be-measured angle in a same manner. However, in the solution in which the power values corresponding to the one or more PRS resource identifiers at the corresponding preset angle are sorted at all angles, the second power value needs to be transmitted during transmission of the assistance data. This is because when determining power information corresponding to one or more PRS resource identifiers which correspond to each of a plurality of to-be-measured angles, a positioning device needs to determine the power information by referring to the second power value; or a positioning device needs to restore, at all to-be-measured angles based on the second power value, power values corresponding to the PRS resource identifiers at the corresponding to-be-measured angle. This is not limited in the embodiments of this application.

In some embodiments, in the embodiments of this application, the one or more PRS resource identifiers included in each group of mapping relationships are PRS resource identifiers of all PRS resources that need to be measured at the corresponding preset angle. Alternatively, the one or more PRS resource identifiers included in each group of mapping relationships are PRS resource identifiers of some PRS resources that need to be measured at the corresponding preset angle.

In comparison with a case in which the one or more PRS resource identifiers included in each group of mapping relationships are PRS resource identifiers of all PRS resources that need to be measured at the corresponding preset angle, if the one or more PRS resource identifiers included in each group of mapping relationships are PRS resource identifiers of some PRS resources that need to be measured at the corresponding preset angle, a data amount of the assistance data may be reduced to some extent. Therefore, signaling overheads can be reduced during transmission of the assistance data, and the positioning latency and power consumption can be reduced. In comparison with a case in which the one or more PRS resource identifiers included in each group of mapping relationships are PRS resource identifiers of some PRS resources that need to be measured at the corresponding preset angle, if the one or more PRS resource identifiers included in each group of mapping relationships are PRS resource identifiers of all PRS resources that need to be measured at the corresponding preset angle, accuracy of angle estimation can be improved, and the positioning accuracy is improved to a greater extent.

In an embodiment, if power values corresponding to PRS resource identifiers of all PRS resources that need to be measured at the corresponding preset angle are sorted in descending order, some PRS resources include PRS resources corresponding to first M power values after the sorting, where M is a positive integer greater than 1.

For example, it is assumed that the power values corresponding to PRS resource identifiers of all PRS resources that need to be measured at the corresponding preset angle are shown in Table 2, and M=3. Assuming that the power information corresponding to each PRS resource identifier at the corresponding preset angle includes the power value corresponding to each PRS resource identifier at the corresponding preset angle, the assistance data provided in the embodiments of this application may be shown in Table 13.

TABLE 13

| Angle | PRS resource identifier | Power value |
| --- | --- | --- |
| AOD#1 = 2° | ID4 | 12.1 |
| | ID1 | 9.5 |
| | ID2 | 5.6 |
| AOD#2 = 4° | ID2 | 11.5 |
| | ID4 | 6.7 |
| | ID1 | 4.1 |

Certainly, if the power information corresponding to each PRS resource identifier at the corresponding preset angle includes the value obtained after the power value corresponding to each PRS resource identifier at the corresponding preset angle is compressed, the assistance data provided in the embodiments of this application is values obtained by compressing the first M power values obtained after the power values corresponding to the PRS resource identifiers of all PRS resources that need to be measured at the corresponding preset angle are sorted in descending order. For a corresponding compression method, refer to the foregoing embodiment. Details are not described herein again.

Figure 9A:
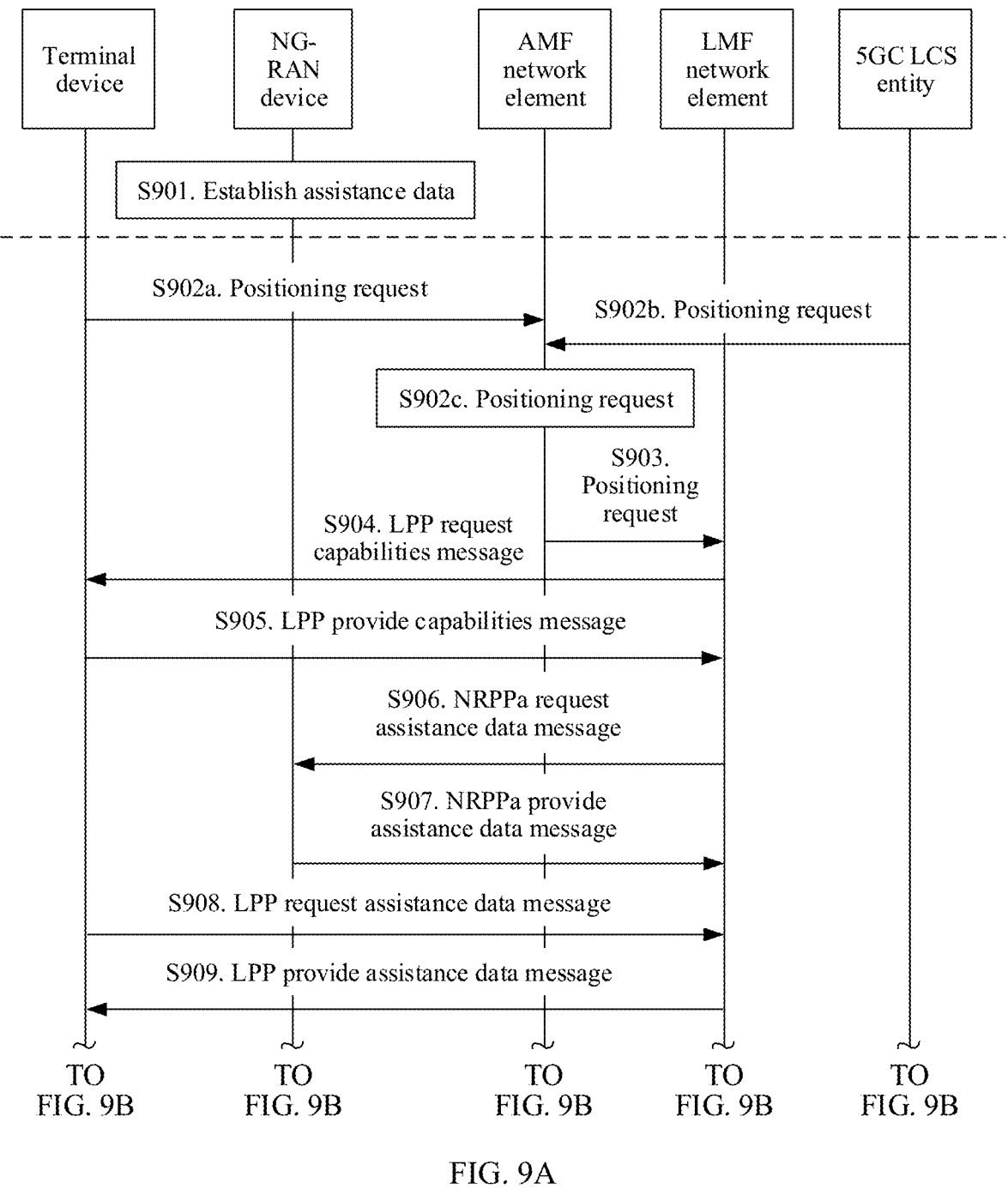
FIG. 9A and FIG. 9B is a schematic flowchart 1 of a positioning method according to an embodiment of this application.
Figure 9B:
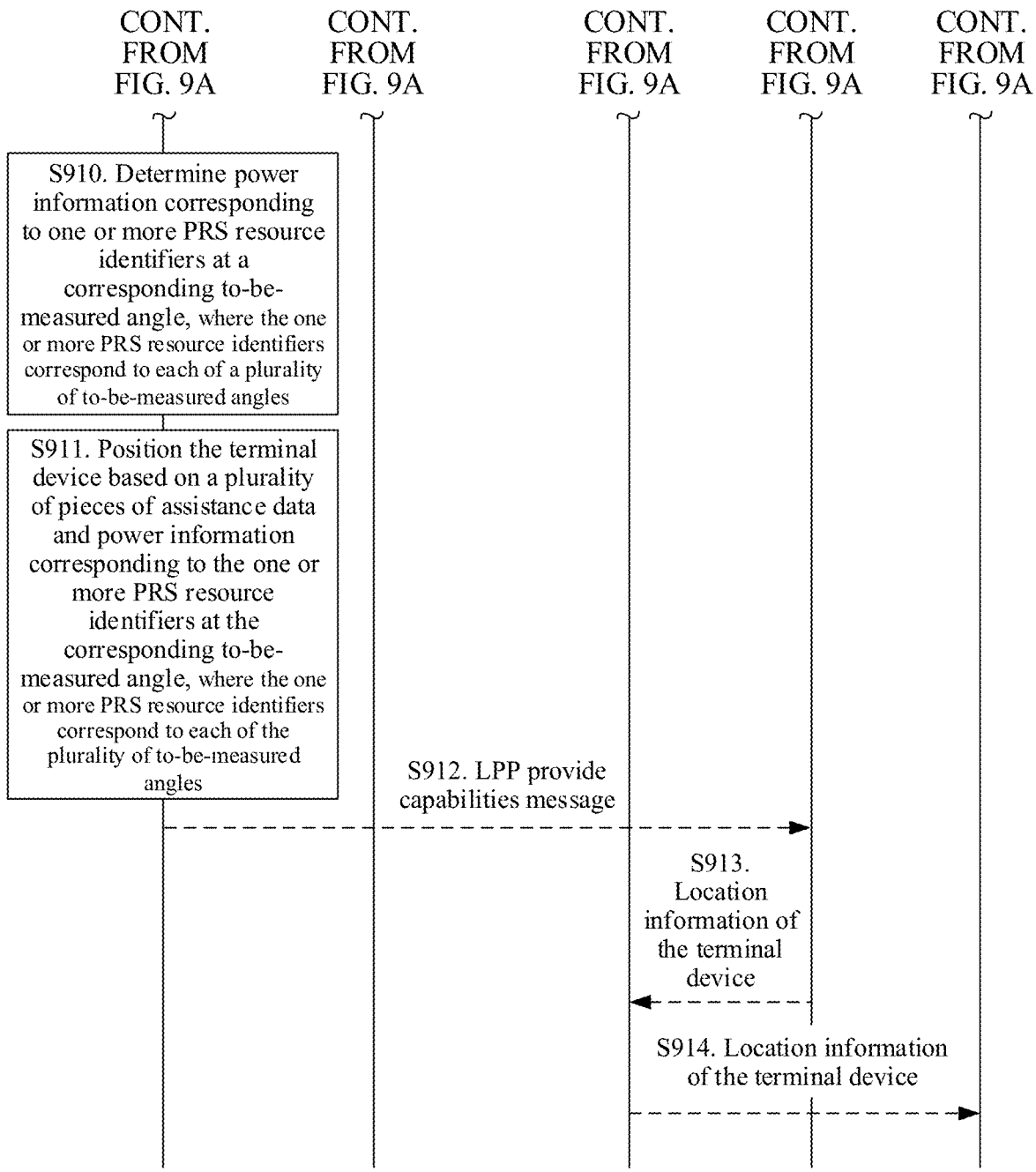

With reference to the foregoing description of the assistance data, assuming that the positioning system shown in FIG. 5 is applied to a 5G mobile communication system and that the access network device is an NG-RAN device, and referring to the positioning system shown in FIG. 6 or FIG. 7, an embodiment of this application provides a positioning method. As shown in FIG. 9A and FIG. 9B, the positioning method includes the following operations.

An NG-RAN device establishes assistance data, where the assistance data includes one or more groups of mapping relationships corresponding to one or more angles.

In some embodiments, in this embodiment of this application, the NG-RAN device may obtain, from a terminal device, a power value corresponding to each of one or more PRS resource identifiers at one or more preset angles, and establish the assistance data based on the power value corresponding to each of the one or more PRS resource identifiers at the one or more preset angles. A power value corresponding to a PRS resource identifier at a preset angle may be an average value of power values obtained by the NG-RAN device from different terminal devices and corresponding to the PRS resource identifier at the preset angle, or may be a power value obtained by the NG-RAN device from a terminal device and corresponding to the PRS resource identifier at the preset angle. This is not limited in this embodiment of this application.

For example, the power value corresponding to each of the one or more PRS resource identifiers at the one or more preset angles may be shown in the foregoing Table 2.

When power information of each PRS resource identifier in the one or more groups of mapping relationships at a corresponding preset angle includes a power value corresponding to each PRS resource identifier at the corresponding preset angle, that the NG-RAN device establishes the assistance data based on the power value corresponding to each of the one or more PRS resource identifiers at the one or more preset angles includes: the NG-RAN device establishes the one or more groups of mapping relationships corresponding to the one or more preset angles, where each of the one or more groups of mapping relationships corresponds to one of the one or more preset angles, and each group of mapping relationships includes a mapping relationship between each of the one or more PRS resource identifiers and a power value corresponding to each PRS resource identifier at a corresponding preset angle.

When power information of each PRS resource identifier in the one or more groups of mapping relationships at a corresponding preset angle includes a value obtained after a power value corresponding to each PRS resource identifier at the corresponding preset angle is compressed, that the NG-RAN device establishes the assistance data based on the power value corresponding to each of the one or more PRS resource identifiers at the one or more preset angles includes: the NG-RAN device first compresses, by using the data compression method provided in the foregoing embodiment, the power value corresponding to each PRS resource identifier at the corresponding preset angle, and further establishes one or more groups of mapping relationships corresponding to the one or more angles, where each of the one or more groups of mapping relationships corresponds to one of the one or more preset angles, and each group of mapping relationships includes a mapping relationship between each of the one or more PRS resource identifiers and the value obtained after the power value corresponding to each PRS resource identifier at the corresponding preset angle is compressed.

In some embodiments, in this embodiment of this application, the NG-RAN device may periodically update the assistance data. For example, the assistance data is updated based on power values recently obtained from different terminal devices and corresponding to each of the one or more PRS resource identifiers at the one or more preset angles. Because the assistance data is periodically updated, accuracy of the assistance data can be ensured, and further, accuracy of subsequently estimating a to-be-measured angle can be improved, and positioning accuracy is improved to a greater extent.

It should be noted that operation S901 in this embodiment of this application may be considered as an offline part, that is, an operation performed before a positioning procedure of a terminal device is started. This is not limited in this embodiment of this application.

Further, in this embodiment of this application, a positioning procedure may be initiated by performing the following operations S902a, S902b, or S902c.

S902a. The terminal device sends a positioning request to an AMF network element. Correspondingly, the AMF network element receives the positioning request from the terminal device. The positioning request is used to request to position the terminal device.

In other words, the terminal device may actively initiate a procedure for positioning the terminal device.

S902b. A 5G core (5GC) location services (LCS) entity sends a positioning request to the AMF network element. Correspondingly, the AMF network element receives the positioning request from the 5GC LCS entity. The positioning request is used to request to position the terminal device.

In other words, the 5GC LCS entity may initiate a procedure for positioning the terminal device.

For example, the 5GC LCS entity in this embodiment of this application may be, for example, a gateway mobile location center (GMLC).

S902c. The AMF network element determines some positioning service requirements of the terminal device (for example, the terminal device needs an emergency call), and triggers a positioning request by itself.

In other words, the AMF network element may initiate a procedure for positioning the terminal device.

It should be understood that only several manners of initiating a positioning procedure are provided above as examples. There may be another manner of initiating a positioning procedure. This is not limited in this embodiment of this application.

Further, the positioning method provided in this embodiment of this application further includes the following operations S903 to S909.

S903. The AMF network element sends a positioning request to an LMF network element. Correspondingly, the LMF network element receives the positioning request from the AMF network element. The positioning request is used to request to position the terminal device.

S904. The LMF network element sends an LTE positioning protocol (LPP) message 1 to the terminal device. Correspondingly, the terminal device receives the LPP message 1 from the LMF network element. The LPP message 1 is used to request a positioning capability of the terminal device.

For example, as shown in FIG. 9A and FIG. 9B, the LPP message 1 in this embodiment of this application may be, for example, an LPP request capabilities (LPP Request Capabilities) message.

S905. The terminal device sends an LPP message 2 to the LMF network element. The LMF network element receives the LPP message 2 from the terminal device. The LPP message 2 carries the positioning capability of the terminal device.

For example, in this embodiment of this application, the positioning capability of the terminal device may be, for example, a UE-based DL-time difference of arrival (TDOA) or a UE-based DL-AOD in UE-based positioning. This is not limited in this embodiment of this application.

For example, as shown in FIG. 9A and FIG. 9B, the LPP message 2 in this embodiment of this application may be, for example, an LPP provide capabilities (LPP Provide Capabilities) message.

S906. The LMF network element sends an NR positioning protocol annex (NRPPa) message 1 to the NG-RAN device. Correspondingly, the NG-RAN device receives the NRPPa message 1 from the LMF network element. The NRPPa message 1 is used to request positioning assistance data.

For example, as shown in FIG. 9A and FIG. 9B, the NRPPa message 1 in this embodiment of this application may be, for example, an NRPPa request assistance data (NRPPa Request Assistance Data) message.

S907. The NG-RAN device sends an NRPPa message 2 to the LMF network element. Correspondingly, the LMF network element receives the NRPPa message 2 from the NG-RAN device. The NRPPa message 2 carries the assistance data provided by the NG-RAN device for the LMF network element.

For example, as shown in FIG. 9A and FIG. 9B, the NRPPa message 2 in this embodiment of this application may be, for example, an NRPPa provide assistance data (NRPPa Provide Assistance Data) message.

In this embodiment of this application, the assistance data provided by the NG-RAN device for the LMF network element not only includes the one or more groups of mapping relationships corresponding to the one or more preset angles in the foregoing embodiment, but also includes some assistance data that can be provided by the NG-RAN device for the LMF network element for assisted positioning in the conventional technology, for example, location information of the NG-RAN device. This is not limited in this embodiment of this application.

In some embodiments, in a manner different from the manner of obtaining the assistance data in operations S906 and S907 in this embodiment of this application, without being requested, the NG-RAN device may also actively send, to the LMF network element by using an NRPPa message, assistance data that can be provided by the NG-RAN device for the LMF network element. This is not limited in this embodiment of this application.

S908. The terminal device sends an LPP message 3 to the LMF network element. Correspondingly, the LMF network element receives the LPP message 3 from the terminal device. The LPP message 3 is used to request positioning assistance data.

For example, as shown in FIG. 9A and FIG. 9B, the LPP message 3 in this embodiment of this application may be, for example, an LPP Request Assistance Data (LPP Request Assistance Data) message.

S909. The LMF network element sends an LPP message 4 to the terminal device. Correspondingly, the terminal device receives the LPP message 4 from the LMF network element. The LPP message 4 carries the assistance data provided by the LMF network element for the terminal device.

For example, as shown in FIG. 9A and FIG. 9B, the LPP message 4 in this embodiment of this application may be, for example, an LPP provide assistance data (LPP Provide Assistance Data) message.

In this embodiment of this application, the assistance data provided by the LMF network element for the terminal device includes not only the assistance data provided by the NG-RAN device for the LMF network element, but also other assistance data that can be provided by the LMF network element for the terminal device (which may be assistance data obtained by the LMF network element from another gateway), for example, physical cell IDs (PCIs), global cell IDs (GCIs), TP IDs, and PRS configuration information. This is not limited in this embodiment of this application.

In some embodiments, in a manner different from the manner of obtaining the assistance data in operations S908 and S909 in this embodiment of this application, without being requested, the LMF network element may actively provide the assistance data for the terminal device. This is not limited in this embodiment of this application.

It should be noted that the foregoing operations S901 to S909 merely provide an example of a procedure in which one access network device participates in the positioning method when the terminal device obtains the assistance data. Certainly, in the positioning method, when the terminal device needs to obtain a plurality of assistance data, participation of a plurality of access network devices may be required. For processing and an interaction procedure (not shown in FIG. 9A and FIG. 9B) of each access network device, refer to processing and the related interaction procedure of the NG-RAN device in the foregoing operations S901 to S909. Details are not described herein again.

Further, the positioning method provided in this embodiment of this application further includes the following operations S910 and S911.

S910. The terminal device determines power information corresponding to one or more PRS resource identifiers which correspond to each of a plurality of to-be-measured angles.

In some embodiments, in this embodiment of this application, that the terminal device determines power information corresponding to one or more PRS resource identifiers which correspond to each of a plurality of to-be-measured angles may include: the terminal device receives a reference signal from the NG-RAN device in FIG. 9A and FIG. 9B, and determines, based on the reference signal, power information corresponding to one or more PRS resource identifiers at a to-be-measured angle at the to-be-measured angle; and the terminal device may receive a reference signal from another access network device (not shown in FIG. 9A and FIG. 9B), and determine, based on the reference signal, power information corresponding to one or more PRS resource identifiers at another to-be-measured angle at the another to-be-measured angle.

In some embodiments, in this embodiment of this application, the terminal device may determine, based on a reference signal, a power value corresponding to one or more PRS resource identifiers at a to-be-measured angle at the to-be-measured angle. Further, in a an embodiment, the terminal device may use the power value corresponding to the one or more PRS resource identifiers at the to-be-measured angle as power information corresponding to the one or more PRS resource identifiers at the to-be-measured angle. Alternatively, in another possible implementation, the terminal device may compress the power value corresponding to the one or more PRS resource identifiers at the to-be-measured angle, and use a value obtained after the power value corresponding to the one or more PRS resource identifiers at the to-be-measured angle is compressed, as power information corresponding to the one or more PRS resource identifiers at the to-be-measured angle. A corresponding compression method is consistent with that on the NG-RAN device side. Refer to the related description in the foregoing assistance data. Details are not described herein again.

In some embodiments, in this embodiment of this application, if the one or more PRS resource identifiers included in each group of mapping relationships in the assistance data are PRS resource identifiers of all PRS resources that need to be measured at the corresponding preset angle, the one or more PRS resource identifiers at each to-be-measured angle are PRS resource identifiers of all PRS resources that need to be measured at the corresponding to-be-measured angle; or if the one or more PRS resource identifiers included in each group of mapping relationships in the assistance data are PRS resource identifiers of some PRS resources that need to be measured at the corresponding preset angle, the one or more PRS resource identifiers at each to-be-measured angle are PRS resource identifiers of some PRS resources that need to be measured at the corresponding to-be-measured angle. In an embodiment, if power values corresponding to PRS resource identifiers of all PRS resources that need to be measured at the corresponding to-be-measured angle are sorted in descending order, some PRS resources that need to be measured at the corresponding to-be-measured angle include PRS resources corresponding to first M power values after the sorting, where M is a positive integer greater than 1. This is centrally described herein, and not described again later.

S911. The terminal device positions the terminal device based on the plurality of assistance data and the power information corresponding to the one or more PRS resource identifiers at the corresponding to-be-measured angle, where the one or more PRS resource identifiers correspond to each of the plurality of to-be-measured angles.

In some embodiments, in this embodiment of this application, that the terminal device positions the terminal device based on the plurality of assistance data and the power information corresponding to the one or more PRS resource identifiers at the corresponding to-be-measured angle, where the one or more PRS resource identifiers correspond to each of the plurality of to-be-measured angles may include: the terminal device determines the plurality of to-be-measured angles based on the plurality of assistance data and the power information corresponding to the one or more PRS resource identifiers at the corresponding to-be-measured angle, where the one or more PRS resource identifiers correspond to each of the plurality of to-be-measured angles; and further, the terminal device positions the terminal device based on the plurality of to-be-measured angles and location information of an access network device corresponding to each of the plurality of to-be-measured angles.

It should be understood that, in addition to the plurality of to-be-measured angles and the location information of the access network device corresponding to each of the plurality of to-be-measured angles, a basis for positioning the terminal device may further include other assistance data obtained by the terminal device from the LMF network element. This is not limited in this embodiment of this application.

For a manner of positioning the terminal device by the terminal device based on the plurality of to-be-measured angles and the location information of the access network device corresponding to each of the plurality of to-be-measured angles, refer to the conventional technology. For example, in a DL-AOD positioning method in a two-dimensional plane, location information of the terminal device may be determined with reference to the foregoing formula (1). Details are not described herein again.

In this embodiment of this application, that the terminal device determines the plurality of to-be-measured angles based on the plurality of assistance data and the power information corresponding to the one or more PRS resource identifiers at the corresponding to-be-measured angle, where the one or more PRS resource identifiers correspond to each of the plurality of to-be-measured angles may include: for any to-be-measured angle, matching is performed between power information corresponding to one or more PRS resource identifiers at the to-be-measured angle at the corresponding to-be-measured angle and one or more groups of mapping relationships included in corresponding assistance data and corresponding to one or more angles; and if a similarity between power information corresponding to one or more PRS resource identifiers included in a group of mapping relationships at a corresponding preset angle and power information corresponding to one or more PRS resource identifiers at the to-be-measured angle at the corresponding to-be-measured angle is highest (for example, a maximum likelihood estimation method is used), the preset angle corresponding to the group of mapping relationships is determined as the to-be-measured angle.

For example, assuming that a to-be-measured angle between the NG-RAN device and the terminal device in FIG. 9A and FIG. 9B is 4°, both the terminal device and the NG-RAN device compress a power value corresponding to each PRS resource identifier at the corresponding preset or to-be-measured angle according to the method described in scenario 1 in the foregoing embodiment. Power information corresponding to each PRS resource identifier in the mapping relationship at the corresponding preset angle is shown in Table 3. Power information obtained by the terminal device and corresponding to one or more PRS resource identifiers at the to-be-measured angle at the corresponding to-be-measured angle is shown in Table 14. Therefore, by comparing Table 14 with Table 3, it can be learned that a similarity between power information corresponding to AOD#2=4° in Table 3 and the power information corresponding to the one or more PRS resource identifiers at the to-be-measured angle at the corresponding to-be-measured angle is highest. Therefore, it can be determined that the to-be-measured angle is 4°.

TABLE 14

| PRS resource identifier | Power info |
|---|---|
| ID1 | 7.1 |
| ID2 | 0 |
| ID3 | 10 |
| ID4 | 5 |

It should be understood that when there is a plurality of to-be-measured angles and a plurality of assistance data, any to-be-measured angle is an angle between a PRS resource (beam) of an access network device and a receive beam of the terminal device. In this case, when matching is performed between power information corresponding to one or more PRS resource identifiers at the to-be-measured angle at the corresponding to-be-measured angle and one or more groups of mapping relationships included in corresponding assistance data and corresponding to one or more angles, the corresponding assistance data should be understood as assistance data established by using the access network device. For example, the assistance data corresponding to the to-be-measured angle between the NG-RAN device and the terminal device in FIG. 9A and FIG. 9B is the assistance data established by using the NG-RAN device in FIG. 9A and FIG. 9B. This is centrally described herein, and not described again later.

In some embodiments, the foregoing operations S910 and S911 are described by using an example in which the terminal device determines the power information corresponding to the one or more PRS resource identifiers at the corresponding to-be-measured angle, where the one or more PRS resource identifiers correspond to each of the plurality of to-be-measured angles, and further, the terminal device determines the plurality of to-be-measured angles based on the plurality of assistance data and the power information corresponding to the one or more PRS resource identifiers at the corresponding to-be-measured angle, where the one or more PRS resource identifiers correspond to each of the plurality of to-be-measured angles. Certainly, in a scenario in which the assistance data is compressed for transmission, in this embodiment of this application, alternatively, the terminal device may determine a power value corresponding to the one or more PRS resource identifiers at the corresponding to-be-measured angle, where the one or more PRS resource identifiers correspond to each of the plurality of to-be-measured angles, and further, the terminal device determines the plurality of to-be-measured angles based on the plurality of assistance data and the power value corresponding to the one or more PRS resource identifiers at the corresponding to-be-measured angle, where the one or more PRS resource identifiers correspond to each of the plurality of to-be-measured angles. In other words, for any to-be-measured angle, the terminal device may restore power information corresponding to one or more PRS resource identifiers included in the corresponding assistance data at the corresponding preset angle to a power value corresponding to the one or more PRS resource identifiers at the corresponding preset angle. Further, matching is performed between this power value and the power value corresponding to the one or more PRS resource identifiers at the to-be-measured angle at the corresponding to-be-measured angle, to determine the corresponding to-be-measured angle. This is not limited in this embodiment of this application.

For example, with respect to the compression method in the scenario 4 in the foregoing embodiment, for any to-be-measured angle, the terminal device may restore, based on a largest value (that is, the foregoing second power value) obtained after power values corresponding to the one or more PRS resource identifiers at the corresponding preset angle are sorted at all preset angles, the power information corresponding to the one or more PRS resource identifiers included in the corresponding assistance data at the corresponding preset angle to the power value corresponding to the one or more PRS resource identifiers at the corresponding preset angle, and further perform matching between this power value and the power value corresponding to the one or more PRS resource identifiers at the to-be-measured angle at the corresponding to-be-measured angle, to determine the corresponding to-be-measured angle.

In some embodiments, in this embodiment of this application, if the positioning procedure is not initiated by the terminal device (that is, operation S901a is not performed), but is initiated by the 5GC LCS entity (that is, operation S902b is performed) or the AMF network element (that is, operation S902c is performed), the positioning method provided in this embodiment of this application further includes the following operations S912 and S913.

S912. The terminal device sends an LPP message 5 to the LMF network element. Correspondingly, the LMF network element receives the LPP message 5 from the terminal device. The LPP message 5 carries the location information of the terminal device.

For example, as shown in FIG. 9A and FIG. 9B, the LPP message 5 in this embodiment of this application may be, for example, an LPP provide capabilities message.

S913. The LMF network element sends the location information of the terminal device to the AMF network element. Correspondingly, the AMF network element receives the location information of the terminal device from the LMF network element.

In some embodiments, in this embodiment of this application, if the positioning procedure is initiated by the 5GC LCS entity (that is, operation S902b is performed), the positioning method provided in this embodiment of this application further includes the following operation S914.

S914. The AMF network element sends the location information of the terminal device to the 5GC LCS entity. Correspondingly, the 5GC LCS entity receives the location information of the terminal device from the AMF network element.

Currently, only a rough range of an angle (angle of departure or angle of arrival) can be estimated based on existing assistance data, and high-accuracy positioning cannot be implemented. Based on the positioning method provided in this embodiment of this application, the assistance data in this embodiment of this application includes the one or more groups of mapping relationships corresponding to the one or more preset angles, each of the one or more groups of mapping relationships corresponds to one of the one or more preset angles, and each group of mapping relationships includes the mapping relationship between each of the one or more PRS resource identifiers and the power information corresponding to each PRS resource identifier at the corresponding preset angle. Therefore, the terminal device can accurately estimate a to-be-measured angle (for example, an angle of departure or an angle of arrival) based on the plurality of assistance data and the power information corresponding to the one or more PRS resource identifiers at the corresponding to-be-measured angle, where the one or more PRS resource identifiers correspond to each of the plurality of to-be-measured angles, and can further implement high-accuracy positioning. According to another aspect, in the positioning procedure provided in this embodiment of this application, the assistance data is established before positioning, and the terminal device performs positioning based on the assistance data after positioning. This provides an implementable solution to UE-based AoD positioning.

The processor 801 in the communication apparatus 800 shown in FIG. 8 may perform actions of the terminal device, the NG-RAN device, or the LMF network element in operations S901 to S914 by invoking the application program code stored in the memory 803.

Figure 10A:
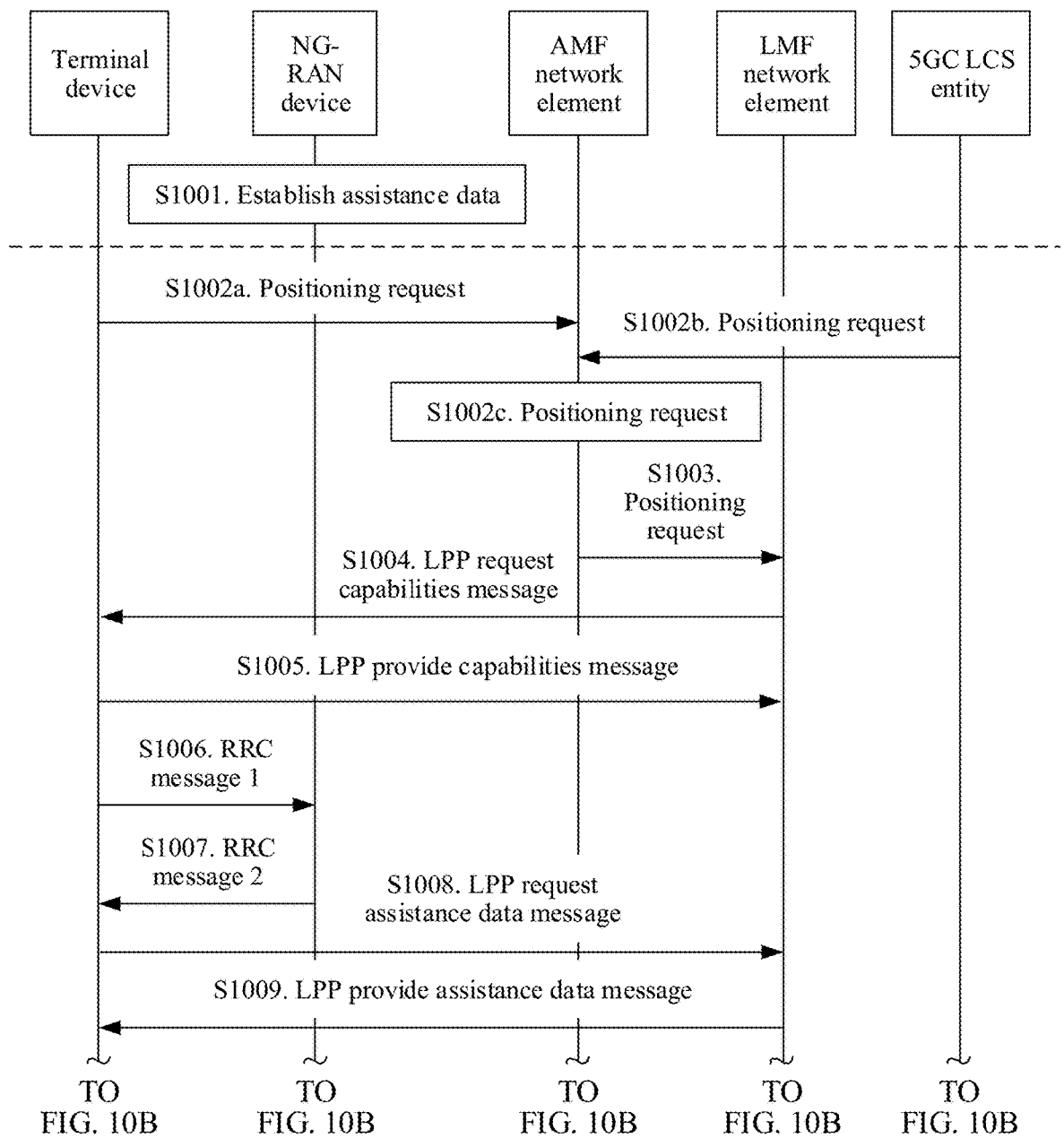
FIG. 10B is schematic flowchart 2 of a positioning method according to an embodiment of this application.
Figure 10B:
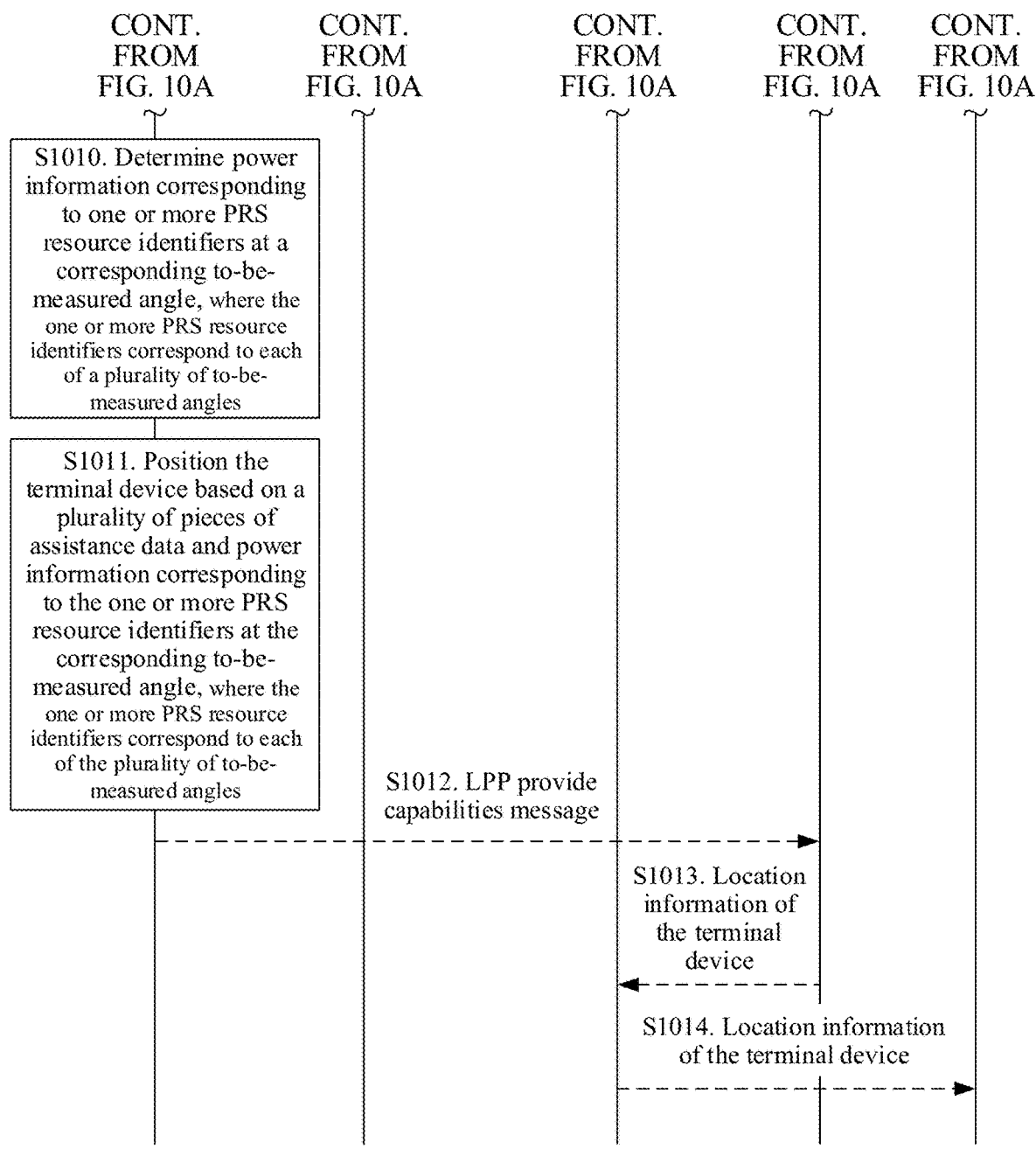

With reference to the foregoing description of the assistance data, assuming that the positioning system shown in FIG. 5 is applied to a 5G mobile communication system and that the access network device is an NG-RAN device, and referring to the positioning system shown in FIG. 6 or FIG. 7, an embodiment of this application provides another positioning method. As shown in FIG. 10A and FIG. 10B, the positioning method includes the following operations.

S1001 to S1005 are the same as operations S901 to S905 in the embodiment shown in FIG. 9A and FIG. 9B. For the related description, refer to the embodiment shown in FIG. 9A and FIG. 9B. Details are not described herein again.

S1006. The terminal device sends an RRC message 1 to the NG-RAN device. Correspondingly, the NG-RAN device receives the RRC message 1 from the terminal device. The RRC message 1 is used to request positioning assistance data.

S1007. The NG-RAN device sends an RRC message 2 to the terminal device. Correspondingly, the terminal device receives the RRC message 2 from the NG-RAN device. The RRC message 2 carries the assistance data provided by the NG-RAN device for the LMF network element.

In this embodiment of this application, the assistance data provided by the NG-RAN device for the terminal device not only includes the one or more groups of mapping relationships corresponding to the one or more angles in the foregoing embodiment, but also includes some assistance data that can be provided by the NG-RAN device for the LMF network element for assisted positioning in the conventional technology, for example, location information of the NG-RAN device. This is not limited in this embodiment of this application.

In some embodiments, in a manner different from the manner of obtaining the assistance data in operations S1006 and S1007 in this embodiment of this application, without being requested, the NG-RAN device may also actively send, to the terminal device by using an RRC message, assistance data that can be provided by the NG-RAN device for the terminal device. This is not limited in this embodiment of this application.

S1008. The terminal device sends an LPP message 3 to the LMF network element. Correspondingly, the LMF network element receives the LPP message 3 from the terminal device. The LPP message 3 is used to request positioning assistance data.

For example, as shown in FIG. 10A and FIG. 10B, the LPP message 3 in this embodiment of this application may be, for example, an LPP Request Assistance Data (LPP Request Assistance Data) message.

S1009. The LMF network element sends an LPP message 4 to the terminal device. Correspondingly, the terminal device receives the LPP message 4 from the LMF network element. The LPP message 4 carries the assistance data provided by the LMF network element for the terminal device.

For example, as shown in FIG. 10A and FIG. 10B, the LPP message 4 in this embodiment of this application may be, for example, an LPP provide assistance data (LPP Provide Assistance Data) message.

In this embodiment of this application, the assistance data provided by the LMF network element for the terminal device is assistance data obtained by the LMF network element from another gateway, for example, PCIs, GCIs, TP IDs, and PRS configuration information. This is not limited in this embodiment of this application.

In some embodiments, in a manner different from the manner of obtaining the assistance data in operations S1008 and S1009 in this embodiment of this application, without being requested, the LMF network element may actively provide the assistance data for the terminal device. This is not limited in this embodiment of this application.

It should be noted that the foregoing operations S1001 to S1009 merely provide an example of a procedure in which one access network device participates in the positioning method when the terminal device obtains the assistance data. Certainly, in the positioning method, when the terminal device needs to obtain a plurality of assistance data, participation of a plurality of access network devices may be required. For processing and an interaction procedure (not shown in FIG. 10A and FIG. 10B) of each access network device, refer to processing and the related interaction procedure of the NG-RAN device in the foregoing operations S1001 to S1009. Details are not described herein again.

Further, the positioning method provided in this embodiment of this application further includes the following operations S1010 and S1011.

S1010 and S1011 are the same as operations S910 and S911 in the embodiment shown in FIG. 9A and FIG. 9B. For the related description, refer to the embodiment shown in FIG. 9A and FIG. 9B. Details are not described herein again.

In some embodiments, in this embodiment of this application, if the positioning procedure is not initiated by the terminal device (that is, operation S1001a is not performed), but is initiated by the 5GC LCS entity (that is, operation S1002b is performed) or the AMF network element (that is, operation S1002c is performed), the positioning method provided in this embodiment of this application further includes the following operations S1012 and S1013.

S1012 and S1013 are the same as operations S912 and S913 in the embodiment shown in FIG. 9A and FIG. 9B. For the related description, refer to the embodiment shown in FIG. 9A and FIG. 9B. Details are not described herein again.

In some embodiments, in this embodiment of this application, if the positioning procedure is initiated by the 5GC LCS entity (that is, operation S1002b is performed), the positioning method provided in this embodiment of this application further includes the following operation S1014.

S1014 is the same as operation S914 in the embodiment shown in FIG. 9A and FIG. 9B. For the related description, refer to the embodiment shown in FIG. 9A and FIG. 9B. Details are not described herein again.

For a technical effect of the positioning method in the embodiment shown in FIG. 10A and FIG. 10B, refer to the technical effect of the positioning method in the embodiment shown in FIG. 9A and FIG. 9B. Details are not described herein again.

The processor 801 in the communication apparatus 800 shown in FIG. 8 may perform actions of the terminal device, the NG-RAN device, or the LMF network element in operations S1001 to S1014 by invoking the application program code stored in the memory 803.

It may be understood that, in the foregoing embodiments, the method and/or operation implemented by the terminal device may also be implemented by a component (for example, a chip or a circuit) that can be used for the terminal device; the method and/or operation implemented by the access network device may also be implemented by a component (for example, a chip or a circuit) that can be used for the access network device; and the method and/or operation implemented by the location management device may also be implemented by a component (for example, a chip or a circuit) that can be used for the location management device.

The foregoing mainly describes the solutions provided in embodiments of this application from a perspective of interaction between network elements. Correspondingly, an embodiment of this application further provides a communication apparatus, and the communication apparatus is configured to implement the foregoing methods. The communication apparatus may be the terminal device in the foregoing method embodiments, or an apparatus including the terminal device, or a component that can be used for the terminal device; or the communication apparatus may be the access network device in the foregoing method embodiments, or an apparatus including the access network device, or a component that can be used for the access network device; or the communication apparatus may be the location management device in the foregoing method embodiments, or an apparatus including the location management device, or a component that can be used for the location management device. It may be understood that, to implement the foregoing functions, the communication apparatus includes a corresponding hardware structure and/or software module for performing each function. A person skilled in the art should be easily aware that units, algorithms, and operations in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely a logical function division. In actual implementation, another division manner may be used.

Figure 11:
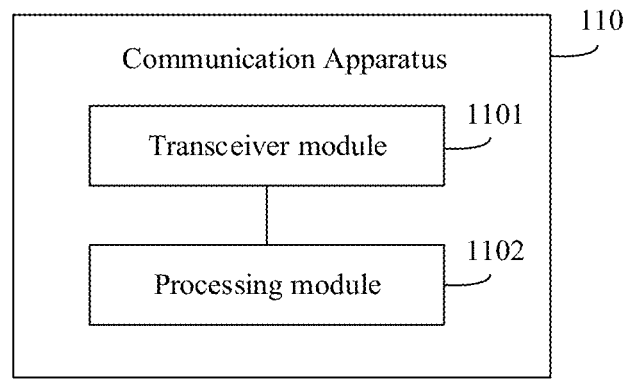
FIG. 11 is a schematic diagram of a structure of another communication apparatus according to an embodiment of this application.

FIG. 11 is a schematic diagram of a structure of a communication apparatus 110. The communication apparatus 110 includes a transceiver module 1101 and a processing module 1102. The transceiver module 1101 may also be referred to as a transceiver unit, and is configured to implement a transceiver function. For example, the transceiver module 1101 may be a transceiver circuit, a transceiver, a transceiver, or a communication interface.

For example, the communication apparatus 110 is the terminal device in the foregoing method embodiment.

The transceiver module 1101 is configured to obtain a plurality of assistance data, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle. The processing module 1102 is configured to determine power information corresponding to one or more PRS resource identifiers which correspond to each of a plurality of to-be-measured angles. The processing module 1102 is further configured to position the terminal device based on the plurality of assistance data and the power information corresponding to the one or more PRS resource identifiers at each of the plurality of to-be-measured angles.

In some embodiments, that the processing module 1102 is further configured to position the terminal device based on the plurality of assistance data and the power information corresponding to the one or more PRS resource identifiers at each of the plurality of to-be-measured angles includes: The processing module 1102 is further configured to determine the plurality of to-be-measured angles based on the plurality of assistance data and the power information corresponding to the one or more PRS resource identifiers at each of the plurality of to-be-measured angles; and position the terminal device based on the plurality of to-be-measured angles and location information of an access network device corresponding to each of the plurality of to-be-measured angles.

In some embodiments, the transceiver module 1101 is configured to receive the plurality of assistance data from a location management device.

Alternatively, optionally, the transceiver module 1101 is configured to receive the plurality of assistance data from one or more access network devices.

In some embodiments, the transceiver module 1101 is further configured to send a positioning request to a mobility management network element, where the positioning request is used to request to position the terminal device.

In some embodiments, the transceiver module 1101 is further configured to send location information of the terminal device to the location management device.

For example, the communication apparatus 110 is the access network device in the foregoing method embodiment.

The processing module 1102 is configured to establish or update assistance data, where the assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the transceiver module 1101 is configured to send the assistance data.

In some embodiments, the transceiver module 1101 is configured to send the assistance data to the location management device.

In some embodiments, the transceiver module 1101 is further configured to receive a first request message from the location management device, where the first request message is used to request the assistance data.

In some embodiments, the transceiver module 1101 is configured to send the assistance data to a terminal device.

In some embodiments, the transceiver module 1101 is further configured to receive a second request message from the location management device, where the first request message is used to request the assistance data.

In some embodiments, the corresponding power information includes a power value corresponding to each of the one or more PRS resource identifiers at the corresponding preset or to-be-measured angle.

In some embodiments, the corresponding power information includes a value obtained after the power value corresponding to each of the one or more PRS resource identifiers at the corresponding preset or to-be-measured angle is compressed.

In an embodiment, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

In an embodiment, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

In some embodiments, the power value includes a radiated power value or a received power value.

In some embodiments, the one or more PRS resource identifiers are PRS resource identifiers of all PRS resources that need to be measured at the corresponding preset or to-be-measured angle; or the one or more PRS resource identifiers are PRS resource identifiers of some PRS resources that need to be measured at the corresponding preset or to-be-measured angle.

In some embodiments, if power values corresponding to PRS resource identifiers of all PRS resources that need to be measured at the corresponding preset or to-be-measured angle are sorted in descending order, the some PRS resources include PRS resources corresponding to first M power values after sorting, where M is a positive integer greater than 1.

The related content of the operations in the method embodiments may be cited in function descriptions of corresponding functional modules. Details are not described herein again.

In this embodiment, the communication apparatus 110 is presented in a form of functional modules obtained through division in an integrated manner. The "module" herein may be a specified ASIC, a circuit, a processor and a memory that execute one or more software or firmware programs, an integrated logic circuit, and/or another component that can provide the foregoing functions.

For example, the processor 801 of the communication apparatus 800 shown in FIG. 8 may invoke the computer-executable instructions stored in the memory 803, to enable the communication apparatus 800 to perform the positioning method in the foregoing method embodiments.

Specifically, functions/implementation processes of the transceiver module 1101 and the processing module 1102 in FIG. 11 may be implemented by the processor 801 in the communication apparatus 800 shown in FIG. 8 by invoking the computer-executable instructions stored in the memory 803. Alternatively, functions/implementation processes of the processing module 1102 in FIG. 11 may be implemented by the processor 801 in the communication apparatus 800 shown in FIG. 8 by invoking the computer-executable instructions stored in the memory 803. Functions/implementation processes of the transceiver module 1101 in FIG. 11 may be implemented by using the communication interface 804 in the communication apparatus 800 shown in FIG. 8.

The communication apparatus 110 provided in this embodiment may perform the foregoing positioning method. Therefore, for technical effects that can be obtained by the apparatus, refer to the foregoing method embodiments. Details are not described herein again.

Figure 12:
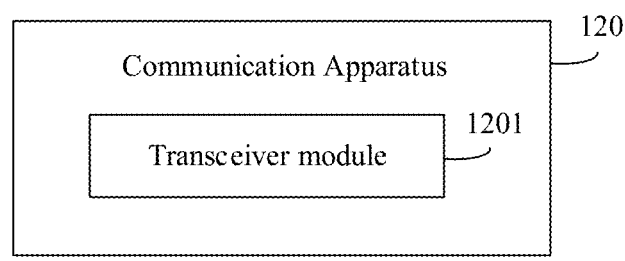
FIG. 12 is a schematic diagram of a structure of yet another communication apparatus according to an embodiment of this application.

FIG. 12 is a schematic diagram of a structure of another communication apparatus 120. The communication apparatus 120 includes a transceiver module 1201. The transceiver module 1201 may also be referred to as a transceiver unit, and is configured to implement a transceiver function. For example, the transceiver module 1201 may be a transceiver circuit, a transceiver, a transceiver, or a communication interface.

For example, the communication apparatus 120 is the location management device in the foregoing method embodiment.

The transceiver module 1201 is configured to obtain a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the transceiver module 1201 is further configured to send the plurality of assistance data to a terminal device.

In some embodiments, the transceiver module 1201 is further configured to send a first request message to the one or more access network devices, where the first request message is used to request the assistance data.

In some embodiments, the transceiver module 1201 is further configured to receive a third request message from the terminal device, where the third request message is used to request the assistance data.

In some embodiments, the transceiver module 1201 is further configured to receive location information of the terminal device from the terminal device, and send the location information of the terminal device to a mobility management network element.

In some embodiments, the corresponding power information includes a power value corresponding to each of the one or more PRS resource identifiers at the corresponding preset angle.

In some embodiments, the corresponding power information includes a value obtained after the power value corresponding to each of the one or more PRS resource identifiers at the corresponding preset angle is compressed.

In an embodiment, the corresponding power information includes a value relative to a reference first power value, for the power value corresponding to each of the one or more PRS resource identifiers at the corresponding preset angle, where the first power value is a largest one of power values corresponding to the one or more PRS resource identifiers at the corresponding preset angle.

In an embodiment, the corresponding power information includes a value relative to a reference previous power value, for the power value corresponding to each of the one or more PRS resource identifiers at the corresponding preset angle, where power values corresponding to the one or more PRS resource identifiers at the corresponding preset angle are sorted in ascending order or descending order.

In some embodiments, the power value includes a radiated power value or a received power value.

In some embodiments, the one or more PRS resource identifiers are PRS resource identifiers of all PRS resources that need to be measured at the corresponding preset angle; or the one or more PRS resource identifiers are PRS resource identifiers of some PRS resources that need to be measured at the corresponding preset angle.

In some embodiments, if power values corresponding to PRS resource identifiers of all PRS resources that need to be measured at the corresponding preset angle are sorted in descending order, the some PRS resources include PRS resources corresponding to first M power values after sorting, where M is a positive integer greater than 1.

The related content of the operations in the method embodiments may be cited in function descriptions of corresponding functional modules. Details are not described herein again.

In this embodiment, the communication apparatus 120 is presented in a form of functional modules obtained through division in an integrated manner. The "module" herein may be a specified ASIC, a circuit, a processor and a memory that execute one or more software or firmware programs, an integrated logic circuit, and/or another component that can provide the foregoing functions.

For example, the processor 801 of the communication device 800 shown in FIG. 8 may invoke the computer-executable instructions stored in the memory 803, to enable the communication apparatus 800 to perform the positioning method in the foregoing method embodiments.

Specifically, functions/implementation processes of the transceiver module 1201 in FIG. 12 may be implemented by the processor 801 in the communication apparatus 800 shown in FIG. 8 by invoking the computer-executable instructions stored in the memory 803. Alternatively, functions/implementation processes of the transceiver module 1201 in FIG. 12 may be implemented by using the communication interface 804 in the communication apparatus 800 shown in FIG. 8.

The communication apparatus 120 provided in this embodiment may perform the foregoing positioning method. Therefore, for technical effects that can be obtained by the apparatus, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a SoC (system-on-a-chip) or an ASIC, or may be an independent semiconductor chip. The processor includes a core for executing software instructions to perform operations or processing, and may further include a hardware accelerator, for example, a field programmable gate array (FPGA), a (programmable logic device (PLD), or a logic circuit that implements a special-purpose logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run software or does not depend on software to perform the foregoing method procedures.

Figure 13:
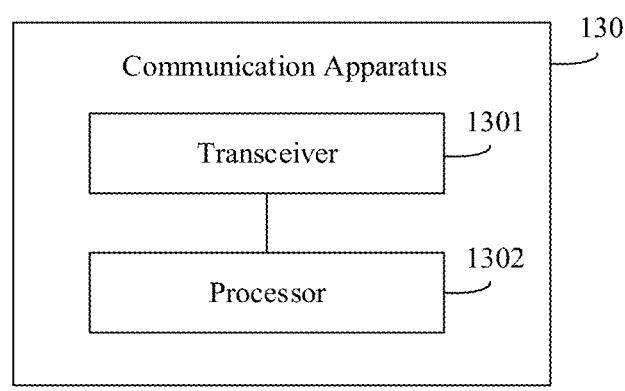
FIG. 13 is a schematic diagram of a structure of still another communication apparatus according to an embodiment of this application.

FIG. 13 is a schematic diagram of a structure of still another communication apparatus 130. The communication apparatus 130 includes a transceiver 1301 and a processor 1302.

For example, the communication apparatus 130 is the terminal device in the foregoing method embodiment.

The transceiver 1301 is configured to obtain a plurality of assistance data, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle. The processor 1302 is configured to determine power information corresponding to one or more PRS resource identifiers which correspond to each of a plurality of to-be-measured angles. The processor 1302 is further configured to position the terminal device based on the plurality of assistance data and the power information corresponding to the one or more PRS resource identifiers at each of the plurality of to-be-measured angles, where the one or more PRS resource identifiers correspond to each of the plurality of to-be-measured angles.

In some embodiments, that the processor 1302 is further configured to position the terminal device based on the plurality of assistance data and the power information corresponding to the one or more PRS resource identifiers at each of the plurality of to-be-measured angles includes: The processor 1302 is further configured to determine the plurality of to-be-measured angles based on the plurality of assistance data and the power information corresponding to the one or more PRS resource identifiers at each of the plurality of to-be-measured angles; and position the terminal device based on the plurality of to-be-measured angles and location information of an access network device corresponding to each of the plurality of to-be-measured angles.

In some embodiments, the transceiver 1301 is configured to receive the plurality of assistance data from a location management device.

Alternatively, optionally, the transceiver 1301 is configured to receive the plurality of assistance data from one or more access network devices.

In some embodiments, the transceiver 1301 is further configured to send a positioning request to a mobility management network element, where the positioning request is used to request to position the terminal device.

In some embodiments, the transceiver 1301 is further configured to send location information of the terminal device to the location management device.

For example, the communication apparatus 130 is the access network device in the foregoing method embodiment.

The processor 1302 is configured to establish or update assistance data, where the assistance data includes one or more groups of mapping relationships corresponding to one or more preset angles, each of the one or more groups of mapping relationships corresponds to one of the one or more preset angles, and each group of mapping relationships includes a mapping relationship between each of one or more PRS resource identifiers and power information corresponding to each PRS resource identifier at a corresponding preset angle; and the transceiver 1301 is configured to send the assistance data.

In some embodiments, the transceiver 1301 is configured to send the assistance data to the location management device.

In some embodiments, the transceiver 1301 is further configured to receive a first request message from the location management device, where the first request message is used to request the assistance data.

In some embodiments, the transceiver 1301 is configured to send the assistance data to a terminal device.

In some embodiments, the transceiver 1301 is further configured to receive a second request message from the location management device, where the first request message is used to request the assistance data.

In some embodiments, the corresponding power information includes a power value corresponding to each of the one or more PRS resource identifiers at the corresponding preset or to-be-measured angle.

In some embodiments, the corresponding power information includes a value obtained after the power value corresponding to each of the one or more PRS resource identifiers at the corresponding preset or to-be-measured angle is compressed.

In an embodiment, the corresponding power information includes a value relative to a reference first power value, for the power value corresponding to each of the one or more PRS resource identifiers at the corresponding preset or to-be-measured angle, where the first power value is a largest one of power values corresponding to the one or more PRS resource identifiers at the corresponding preset or to-be-measured angle.

In an embodiment, the corresponding power information includes a value relative to a reference previous power value, for the power value corresponding to each of the one or more PRS resource identifiers at the corresponding preset or to-be-measured angle, where power values corresponding to the one or more PRS resource identifiers at the corresponding preset or to-be-measured angle are sorted in ascending order or descending order.

In some embodiments, the power value includes a radiated power value or a received power value.

In some embodiments, the one or more PRS resource identifiers are PRS resource identifiers of all PRS resources that need to be measured at the corresponding preset or to-be-measured angle; or the one or more PRS resource identifiers are PRS resource identifiers of some PRS resources that need to be measured at the corresponding preset or to-be-measured angle.

In some embodiments, if power values corresponding to PRS resource identifiers of all PRS resources that need to be measured at the corresponding preset or to-be-measured angle are sorted in descending order, the some PRS resources include PRS resources corresponding to first M power values after sorting, where M is a positive integer greater than 1.

The related content of the operations in the method embodiments may be cited in function descriptions of corresponding functional modules. Details are not described herein again.

The communication apparatus 130 provided in this embodiment may perform the foregoing positioning method. Therefore, for technical effects that can be obtained by the apparatus, refer to the foregoing method embodiments. Details are not described herein again.

Figure 14:
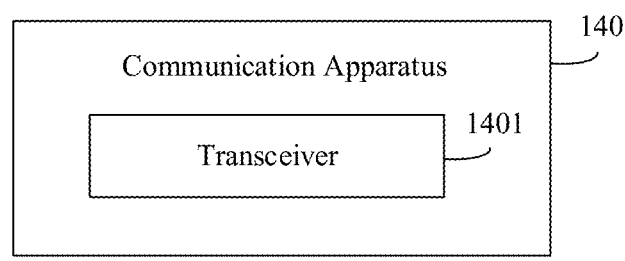
FIG. 14 is a schematic diagram of a structure of still yet another communication apparatus according to an embodiment of this application.

FIG. 14 is a schematic diagram of a structure of yet another communication apparatus 140. The communication apparatus 140 includes a transceiver 1401.

For example, the communication apparatus 140 is the location management device in the foregoing method embodiment.

The transceiver 1401 is configured to obtain a plurality of assistance data from one or more access network devices, where each of the plurality of assistance data includes one or more groups of mapping relationships corresponding to one or more preset angles, each of the one or more groups of mapping relationships corresponds to one of the one or more preset angles, and each group of mapping relationships includes a mapping relationship between each of one or more pediment PRS resource identifiers and power information corresponding to each PRS resource identifier at a corresponding preset angle; and the transceiver 1401 is further configured to send the plurality of assistance data to a terminal device.

In some embodiments, the transceiver 1401 is further configured to send a first request message to the one or more access network devices, where the first request message is used to request the assistance data.

In some embodiments, the transceiver 1401 is further configured to receive a third request message from the terminal device, where the third request message is used to request the assistance data.

In some embodiments, the transceiver 1401 is further configured to receive location information of the terminal device from the terminal device, and send the location information of the terminal device to a mobility management network element.

In some embodiments, the corresponding power information includes a power value corresponding to each of the one or more PRS resource identifiers at the corresponding preset angle.

In some embodiments, the corresponding power information includes a value obtained after the power value corresponding to each of the one or more PRS resource identifiers at the corresponding preset angle is compressed.

In an embodiment, the corresponding power information includes a value relative to a reference first power value, for the power value corresponding to each of the one or more PRS resource identifiers at the corresponding preset angle, where the first power value is a largest one of power values corresponding to the one or more PRS resource identifiers at the corresponding preset angle.

In an embodiment, the corresponding power information includes a value relative to a reference previous power value, for the power value corresponding to each of the one or more PRS resource identifiers at the corresponding preset angle, where power values corresponding to the one or more PRS resource identifiers at the corresponding preset angle are sorted in ascending order or descending order.

In some embodiments, the power value includes a radiated power value or a received power value.

In some embodiments, the one or more PRS resource identifiers are PRS resource identifiers of all PRS resources that need to be measured at the corresponding preset angle; or the one or more PRS resource identifiers are PRS resource identifiers of some PRS resources that need to be measured at the corresponding preset angle.

In some embodiments, if power values corresponding to PRS resource identifiers of all PRS resources that need to be measured at the corresponding preset angle are sorted in descending order, the some PRS resources include PRS resources corresponding to first M power values after sorting, where M is a positive integer greater than 1.

The related content of the operations in the method embodiments may be cited in function descriptions of corresponding functional modules. Details are not described herein again.

The communication apparatus 140 provided in this embodiment may perform the foregoing positioning method. Therefore, for technical effects that can be obtained by the apparatus, refer to the foregoing method embodiments. Details are not described herein again.

In some embodiments, an embodiment of this application further provides a chip system, including at least one processor and an interface. The at least one processor is coupled to a memory by using the interface. When the at least one processor executes a computer program or instructions in the memory, the method in any one of the foregoing method embodiments is performed. In some embodiments, the chip system may include a chip, or may include a chip and another discrete device. This is not limited in this embodiment of this application.

It should be understood that, unless otherwise specified, "/" in descriptions of this application represents an "or" relationship between associated objects. For example, A/B may represent A or B. A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity and an execution sequence, and the terms such as "first" and "second" do not indicate a definite difference. In addition, in the embodiments of this application, the term such as "example" or "for example" is used to represent giving an example, an illustration, or a description. Any embodiment or solution described as "example" or "for example" in embodiments of this application is not to be construed as being more preferred or advantageous than other embodiments or solutions. Exactly, use of the word such as "example" or "for example" is intended to present a related concept in a specific manner for ease of understanding.

All or some of the foregoing embodiments may be implemented by using software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of disclosed embodiments by viewing the accompanying drawings, disclosed content, and the appended claims. In the claims, "comprising" does not exclude another component or another operation, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. A method of ascertaining, by a terminal device or a chip thereof, a device position of the terminal device, the method comprising:

obtaining a plurality of assistance data, wherein each of the plurality of assistance data comprises at least one group of mapping relationships, each of the at least one group of mapping relationships corresponds to a preset angle, and each group of mapping relationships comprises a mapping relationship between each of one or more positioning reference signal (PRS) resource identifiers and power information corresponding to each PRS resource identifier;

determining power information corresponding to one or more PRS resource identifiers which correspond to each of a plurality of to-be-measured angles; and ascertaining a position of the terminal device based on the plurality of assistance data and the power information corresponding to the one or more PRS resource identifiers at each of the plurality of to-be-measured angles.

2. The method according to claim 1, wherein the corresponding power information comprises a power value corresponding to each of the one or more PRS resource identifiers at the corresponding preset or to-be-measured angle.

3. The method according to claim 1, wherein the corresponding power information comprises a value relative to a reference first power value, for the power value corresponding to each of the one or more PRS resource identifiers at the corresponding preset or to-be-measured angle, wherein the first power value is a largest one of power values corresponding to the one or more PRS resource identifiers at the corresponding preset or to-be-measured angle.

4. The method according to claim 1, wherein the one or more PRS resource identifiers are PRS resource identifiers of all PRS resources that need to be measured at the corresponding preset or to-be-measured angle; or the one or more PRS resource identifiers are PRS resource identifiers of some PRS resources that need to be measured at the corresponding preset or to-be-measured angle.

5. The method according to claim 1, wherein the obtaining, by a terminal device, a plurality of assistance data comprises:

receiving the plurality of assistance data from a location management device or from one or more access network devices.

6. The method of claim 1, further comprising:
determining actual power information by measurement; or
determining the actual power information by normalization of the measurement.

7. The method of claim 6, further comprising:
compressing the actual power information using a lossless compression method or a lossy compression method.

8. The method of claim 6, wherein determining the actual power information comprises:

sorting values of power measurements for the actual power information in an order;

based on the order sorted, identifying a largest value as a reference; and obtaining a difference or a ratio between each of the values of the power measurements and the reference, wherein the difference or the ratio is used as the actual power information.

9. The method of claim 6, wherein determining the actual power information comprises:

sorting values of power measurements for the actual power information in an order;

in the order, performing a differentiation operation or a division operation between each value and subsequent value, if any; and obtaining differences in the differentiation operation, or quotients and remainders in the division operation, as the actual power information.

10. The method of claim 1, wherein the preset angle comprises at least one of an azimuth angle of departure (AOD) or a zenith AOD.

11. A communication apparatus comprising:

a transceiver configured to obtain a plurality of assistance data, wherein each of the plurality of assistance data comprises at least one group of mapping relationships, each of the at least one group of mapping relationships corresponds to a preset angle, and each group of mapping relationships comprises a mapping relationship between each of one or more positioning reference signal (PRS) resource identifiers and power information corresponding to each PRS resource identifier; and a processor configured to determine power information corresponding to one or more PRS resource identifiers which correspond to each of a plurality of to-be-measured angles, and to locate a terminal device based on the plurality of assistance data and the power information corresponding to the one or more PRS resource identifiers at each of the plurality of to-be-measured angles.

12. The communication apparatus according to claim 11, wherein the corresponding power information comprises a power value corresponding to each of the one or more PRS resource identifiers at the corresponding preset or to-be-measured angle.

13. The communication apparatus according to claim 11, wherein the corresponding power information comprises a value relative to a reference first power value, for the power value corresponding to each of the one or more PRS resource identifiers at the corresponding preset or to-be-measured angle, wherein the first power value is a largest one of power values corresponding to the one or more PRS resource identifiers at the corresponding preset or to-be-measured angle.

14. The communication apparatus according to claim 11, wherein the one or more PRS resource identifiers are PRS resource identifiers of all PRS resources that need to be measured at the corresponding preset or to-be-measured angle; or the one or more PRS resource identifiers are PRS resource identifiers of some PRS resources that need to be measured at the corresponding preset or to-be-measured angle.

15. The communication apparatus according to claim 11, wherein the transceiver is configured to:

receive the plurality of assistance data from a location management device or from one or more access network devices.

16. A communication apparatus, comprising:
a processor configured to run a group of programs; and
a communication interface configured to communicate with another communication apparatus, wherein the processor enables the communication apparatus to:

obtain a plurality of assistance data, wherein each of the plurality of assistance data comprises at least one group of mapping relationships, each of the at least one group of mapping relationships corresponds to a preset angle, and each group of mapping relationships comprises a mapping relationship between each of one or more positioning reference signal (PRS) resource identifiers and power information corresponding to each PRS resource identifier;

determine power information corresponding to one or more PRS resource identifiers which correspond to each of a plurality of to-be-measured angles; and locate a terminal device based on the plurality of assistance data and the power information corresponding to the one or more PRS resource identifiers at each of the plurality of to-be-measured angles.

17. The communication apparatus according to claim 16, wherein the corresponding power information comprises a power value corresponding to each of the one or more PRS resource identifiers at the corresponding preset or to-be-measured angle.

18. The communication apparatus according to claim 16, wherein the corresponding power information comprises a value relative to a reference first power value, for the power value corresponding to each of the one or more PRS resource identifiers at the corresponding preset or to-be-measured angle, wherein the first power value is a largest one of power values corresponding to the one or more PRS resource identifiers at the corresponding preset or to-be-measured angle.

19. The communication apparatus according to claim 16, wherein the one or more PRS resource identifiers are PRS resource identifiers of all PRS resources that need to be measured at the corresponding preset or to-be-measured angle; or the one or more PRS resource identifiers are PRS resource identifiers of some PRS resources that need to be measured at the corresponding preset or to-be-measured angle.

20. The communication apparatus according to claim 16, wherein the communication apparatus is configured to:

receive the plurality of assistance data from a location management device or from one or more access network devices.

\* \* \* \* \*